(12) United States Patent
Mo

(10) Patent No.: US 12,382,859 B2
(45) Date of Patent: Aug. 12, 2025

(54) COMPOST AND PLANTING SYSTEM AND METHOD THEREOF

(71) Applicant: Jianfeng Mo, Diamond Bar, CA (US)

(72) Inventor: Jianfeng Mo, Diamond Bar, CA (US)

( * ) Notice: Subject to any disclaimer, the term of this patent is extended or adjusted under 35 U.S.C. 154(b) by 499 days.

(21) Appl. No.: 17/992,909

(22) Filed: Nov. 22, 2022

(65) Prior Publication Data

US 2024/0164247 A1 May 23, 2024

(51) Int. Cl.
*A01C 15/00* (2006.01)
*A01C 21/00* (2006.01)

(52) U.S. Cl.
CPC .......... *A01C 15/006* (2013.01); *A01C 21/002* (2013.01)

(58) Field of Classification Search
CPC ....... A01C 15/006; A01C 21/002; A01C 1/02; A01G 9/00; A01G 24/60
See application file for complete search history.

(56) References Cited

U.S. PATENT DOCUMENTS

| | | | | |
|---|---|---|---|---|
| 4,765,092 A * | 8/1988 | Cline | ............... | A01C 1/02 47/61 |
| 7,550,292 B2 * | 6/2009 | Teixeira | ............... | C05F 17/914 435/290.4 |
| 7,867,759 B2 * | 1/2011 | Teixeira | ............... | C05F 17/914 435/290.4 |
| 2019/0119179 A1 * | 4/2019 | DeWaard | ............... | C05F 17/10 |
| 2019/0387660 A1 * | 12/2019 | Loessl | ............... | A01G 24/44 |
| 2021/0076581 A1 * | 3/2021 | Otterman | ............... | A01G 7/045 |
| 2021/0259169 A1 * | 8/2021 | Valiquette | ............... | A01G 24/15 |
| 2021/0291082 A1 * | 9/2021 | Wu | ............... | A01C 3/026 |
| 2024/0164247 A1 * | 5/2024 | Mo | ............... | C05F 17/907 |

FOREIGN PATENT DOCUMENTS

EP 2397456 A2 * 12/2011 .......... C05F 17/0205

* cited by examiner

*Primary Examiner* — Jamie L McGowan
(74) *Attorney, Agent, or Firm* — David & Raymond Patent Firm; Raymond Y Chan

(57) ABSTRACT

A compost and planting system and a method thereof are disclosed, wherein a sewage produced from the organic waste contained in a composting container during decomposition is drained into circulation hubs positioned below a filtering bottom of a composter arrangement and flows into an air-water flowing chamber of an air-water source arrangement through liquid slots of a plurality of circulation hubs positioned in the air-water flowing chamber. A liquid is fed into the air-water flowing chamber of the air-water source arrangement via a liquid inlet to carry the sewage to flow in a lower portion of the air-water flowing chamber while an upper portion of the air-water flowing chamber is maintained to have a flow of air, such that the liquid in the lower portion of the air-water flowing chamber enters the circulation hubs through the liquid slots thereof to be absorbed by the planting soil contained in a soil tub and the circulation hubs positioned below the soil tub.

30 Claims, 16 Drawing Sheets

COMPOST AND PLANTING SYSTEM AND METHOD THEREOF

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to organic waste treatment arrangement, and more particularly to a compost and planting system and method thereof through a bottom-up air-water circulation and irrigation arrangement.

DESCRIPTION OF RELATED ARTS

Compost is a mixture of ingredients used as plant fertilizer to improve soil physical, chemical and biological properties and reduce commercial chemical fertilizers, which is rich in plant nutrients and beneficial organisms, such as bacteria, protozoa, nematodes, and fungi. Composting is an aerobic method of decomposing organic waste, such as plant waste, food waste, recycling organic material and manure, into a humus-like material (compost).

Composting prefers gathering a mix of green waste and brown waste which break down into humus in a process taking months. Green waste such as leaves, grass, and food scraps are materials rich in nitrogen. Brown waste such as stalks, paper, carbon, wood chips are woody materials. Composting can be a multi-step, closely monitored process with measured inputs of water, air, and carbon- and nitrogen-rich materials. Therefore, composting is an essential alternate waste management, especially when it can be taken place in household, since food and other compostable materials make up about twenty percent of waste in landfills, and these materials take longer to biodegrade in the landfill.

It is well known that composting is most efficient with a carbon-to-nitrogen ratio of about 25:1. Nearly all dead plant and animal materials have both carbon and nitrogen in different amounts. Therefore, composting is an ongoing and dynamic process while adding new organic waste, sources of carbon and nitrogen, consistently as well as active management is preferred. In addition, organisms can break down organic matter in compost while it is provided with mixture of water, oxygen, carbon, and nitrogen.

Referring to FIG. 1, a conventional household composter is illustrated, which can be a tank or bunker made of metal or plastic functioning as a bioreactor. Air channels communicate the interior containing chamber of the composter with outside for air circulation to supply oxygen and nitrogen to the organic waste contained therein. Temperature and moisture conductions can be monitored using probes in the mass to allow maintenance of optimum aerobic decomposition conditions if required. The top opening is provided for pouring the organic waste into the composter.

The major problem of the conventional composter is that odor and flying insects are produced during the decomposition of the organic waste and the user has to suffer the stinks, bacteria, germs, flying inserts, and etc. while opening the lid of the top opening. The odor is mainly caused by the biogas and sewage produced during the decomposing of organic waste such as kitchen waste, food waste and rotten plants. It is an unsolved shortcoming of the conventional composter and unhygienic to the user.

To conventional industrial composter, deodorizer and filtration devices such as dewaterer, anaerobic digester, hydropulper, hydrocycloe, and the like can be equipped to remove odors and prevent nourishing of flying inserts. In other words, the industrial composter is an artificial system that requires continuous monitoring and periodical maintenance in order to be properly operated.

Consealing from water and oxygen is an effective way for anticorrosion. Therefore, without water and oxygen, the organic waste is preserved and difficult to decompose into compost. Normally, organic waste ferments and decomposes in six months at an environmental temperature 20-30° C., wherein the higher the temperature, the faster the composting process, and cooler the environment temperature, the slower the composting process. Practically, when the organic matter is completely contained in water and sealed from any oxygen or when the organic matter is concealed in air but sealed from any water moisture, the organic matter will not decompose after hundreds of year.

No matter the conventional household and industrial composters, bacterial agent is preferred to be added in the organic waste for decomposition since such consealing containers are generally short of water and oxygen circulation while both the water and the oxygen are the required elements to effectively and efficiently complete the decomposition of the organic waste into compost.

On the other hand, garden planting requires watering every day to ensure enough water supply to the plants to grow. Most tree roots grow only in the top four inches to twenty inches of soil, that is where there are enough oxygen, moisture, and nutrients to supply the trees. Usually, a tree drip line is usually considered the edge of the a tree's root zone. However, a tree root system often spreads far wider to search for moisture and air in the soil, roots of bigger trees around a house may often grow around or under the foundation of the house that causes soil or ground to rise and can damage a house foundation when roots encounter solid, impervious surfaces such as pipes, sidewalks, curbs and foundations. This upheaval is due to the fact the water was previously taken up by tree roots is now allowed to percolate into the ground that may lead to foundation flooding or erosion.

SUMMARY OF THE PRESENT INVENTION

The invention is advantageous in that it provides a compost and planting system and method thereof, wherein organic waste is composted into compost naturally without producing biogas and sewage to the environment.

Another advantage of the invention is to a compost and planting system and method thereof, which provides a composting container configured for containing disposed organic waste for composting, a collection chamber isolated from the composting container for the user to dispose organic waste therein, an air chamber configured between the collection chamber and the composting container that significantly avoid odor and flying inserts produced in the composting container entering the collection chamber.

Another advantage of the invention is to a compost and planting system and method thereof, wherein an air-water circulation arrangement is provided under the composting container to collect sewage produced during composting while allowing air ventilating therethrough to ensure effective and efficient decomposition of the organic waste in the composting container.

Another advantage of the invention is to a compost and planting system and method thereof, wherein the collected sewage and stink biogas in the air-water circulation arrangement is guided to flow to a bottom-up air-water circulation and irrigation arrangement which is arranged under at least a soil tub and configured to efficiently supply air and moisture to the soil contained in the soil tub for planting one or more vegetables or plants in the soil tub, such that the biogas and sewage produced during the composting of organic waste form the natural fertilizer and nutrients for vegetables and plants planting in the soil tub.

Another advantage of the invention is to a compost and planting system and method thereof, wherein the bottom-up air-water circulation and irrigation arrangement is configured to naturally irrigate the vegetables or plants planting in the soil tub, that is to supply sufficient air and water to the soil contained in the soil tub positioned thereabove in a bottom-up manner, so that no watering to the vegetables or plants is required for planting.

Another advantage of the invention is to a compost and planting system and method thereof, wherein both the air-water circulation arrangement and the bottom-up air water circulation and irrigation arrangement have the same configuration that includes at least an air-water basin, a base platform isolating an air-water chamber defined in the air-water basin with the composting container for the air-water circulation arrangement or the soil tub for the bottom-up air-water circulation and irritation arrangement arranged on top thereof, and a plurality of circulation hubs supported in the air-water chamber communicating with the air-water chamber and the soil tub.

Another advantage of the invention is to a compost and planting system and method thereof, wherein both the air-water circulation arrangement and the bottom-up air water circulation and irrigation arrangement function like a natural groundwater resource to collect draining water, sewage, and biogas from the composter arrangement and supply water and air for the planting arrangement in a bottom-up manner.

Another advantage of the invention is to a compost and planting system and method thereof, wherein no expensive component or artificial deodorizing and filtering devices are required, which substantially reduces the manufacturing and maintenance cost and labor.

Another advantage of the invention is to a compost and planting system and method thereof, wherein both the air-water circulation arrangement and the bottom-up air water circulation and irrigation arrangement are adapted to be configured and assembled side-by-side on any surface, including but not limited to ground, floor, rooftop, balcony, terrace, pool bottom and etc., or even elevated by a shelf or a frame to form an air-water foundation for soil planting thereabove.

Additional advantages and features of the invention will become apparent from the description which follows and may be realized by means of the instrumentalities and combinations particular point out in the appended claims.

According to the present invention, the foregoing and other objects and advantages are attained by a compost and planting system, comprising:

an air-water source arrangement, which has a liquid inlet, a liquid outlet and an air-water flowing chamber defined between the liquid inlet and the liquid outlet, comprising a bottom wall, a base wall and a plurality of tubular circulation hubs spacedly supported between the bottom wall and the base wall in the air-water flowing chamber, each of the plurality of circulation hubs having an upper opening end, a lower opening end, a hub cavity defined between the upper opening end and the lower opening end, and a plurality of liquid slots spacedly formed around the lower opening end communicating the hub cavity with the air-water flowing chamber;

a composter arrangement comprising a composting container, which is mounted on the air-water source arrangement and configured for containing disposed organic waste for composting, having a filtering bottom positioned on at least a first portion of the base wall of the air-water source arrangement; and a planting arrangement comprising at least a soil tub, which mounted on the air-water source arrangement, having a bottom opening communicating with the hub cavities of the circulation hubs of the air-water source arrangement, wherein a planting soil is filled in the soil tub and the hub cavities positioned below the bottom opening of the soil tub;

thereby a sewage produced from the organic waste contained in the composting container during decomposition is drained into the circulation hubs positioned below the filtering bottom of the composter arrangement and flows into the air-water flowing chamber of the air-water source arrangement through the liquid slots of the circulation hubs, and that a liquid is fed into the air-water flowing chamber of the air-water source arrangement via the liquid inlet to carry the sewage to flow in a lower portion of the air-water flowing chamber while an upper portion of the air-water flowing chamber is maintained to have a flow of air, such that the liquid in the lower portion of the air-water flowing chamber enters the circulation hubs through the liquid slots thereof to be absorbed by the planting soil contained in the circulation hubs positioned below the soil tub and the soil tub.

In one embodiment, the air-water source arrangement comprises one or more air-water circulation modules each comprising an air-water basin, a base platform and a predetermined number of the circulation hubs. The air-water basin comprises a basin bottom wall and a basin surrounding wall upwardly extended from a peripheral edge of the bottom wall to define an air-water chamber therein and a top opening. The base platform is sized and configured to be supported in the air-water chamber and cover the top opening, wherein a plurality of circulation holes is evenly and spacedly formed in the base platform. The predetermined number of the circulation hubs is the same number of the circulation holes, wherein each of the predetermined number of the circulation is supported between the base platform and the basin bottom wall of the air-water basin, wherein the upper opening ends of the predetermined number of the circulation hubs are fittingly mounted at the circulation holes of the base platform respectively such that the predetermined number of the circulation hubs is extended downwardly from the circulation holes of the base platform respectively until the lower opening ends of the circulation hubs support on the basin bottom wall of the air-water basin while the hub cavities communicating with the circulation holes respectively, and that the predetermined number of the circulation hubs significantly support the base platform above the basin bottom wall within the air-water basin. The air-water chamber is the space surrounded by the surrounding wall of the air-water basin and defined around the predetermined number of the circulation hubs between the basin bottom wall of the air-water basin and the base platform. Each of the air-water circulation module has at least an inlet opening and an outlet opening provided in the surrounding wall of the air-water basin, wherein the inlet opening is configured as the liquid inlet of the air-water source arrangement or connected to the outlet opening of another air-water circulation module, and the outlet opening is configured as the liquid outlet of the air-water source arrangement or connected to the inlet opening of another air-water circulation module.

In one embodiment, the composter arrangement is mounted on top of at least one of the air-water circulation modules which becomes and functions as an air-water circulation arrangement to collect sewage produced during composting of the organic waste contained in the composting container of the composter arrangement while allowing air ventilating therethrough to ensure effective and efficient decomposition of the organic waste in the composting container.

In one embodiment, the planting arrangement is mounted on top of at least one of the air-water circulation module which becomes and functions as an bottom-up air-water circulation and irrigation arrangement to naturally irrigate vegetables or plants planting in the soil tub of the planting arrangement by supplying sufficient air and water to the soil contained in the soil tub in a bottom-up manner, so that no watering to the vegetables or plants is required for planting.

In one embodiment, the lower opening end of each of the circulation hubs has a wave shape defining a plurality of semi-circular grooves spacedly provided therearound as the plurality of liquid slots thereof. When the at least one air-water circulation module functioned as the air-water circulation arrangement, the semi-circular grooves of each circulation hub allow the sewage produced from the decomposing organic waste to flow out from the hub cavity of the respective circulation hub into the air-water chamber. When the at least one air-water circulation module functioned as the bottom-up air-water circulation and irrigation arrangement, the semi-circular grooves of each circulation hub allow the liquid in the air-water chamber to permeate into the hub cavity of the circulation hub and moisture the soil contained in the hub cavity of the circulation hub and the soil tub mounted on top of the bottom-up air-water circulation and irrigation arrangement in a bottom-up manner.

In one embodiment, the composter arrangement has a collection chamber isolated from the composting container for the user to dispose organic waste therein, and comprises a collection door, which is generally configured to isolate the collection chamber from the composting container so that while the user disposing organic waste in the collection chamber, the user is sheltered from the decomposing organic waste within the composting container, and is operatable to be opened to allow the organic waste disposed in the collection chamber to transfer into the composting container in an isolate and air-tight manner.

In one embodiment, the composter arrangement further has an air chamber configured between the collection chamber and the composting container so as to significantly avoid odor produced in the composting container entering the collection chamber.

Still further objects and advantages will become apparent from a consideration of the ensuing description and drawings.

These and other objectives, features, and advantages of the present invention will become apparent from the following detailed description, the accompanying drawings, and the appended claims.

Figure 1:
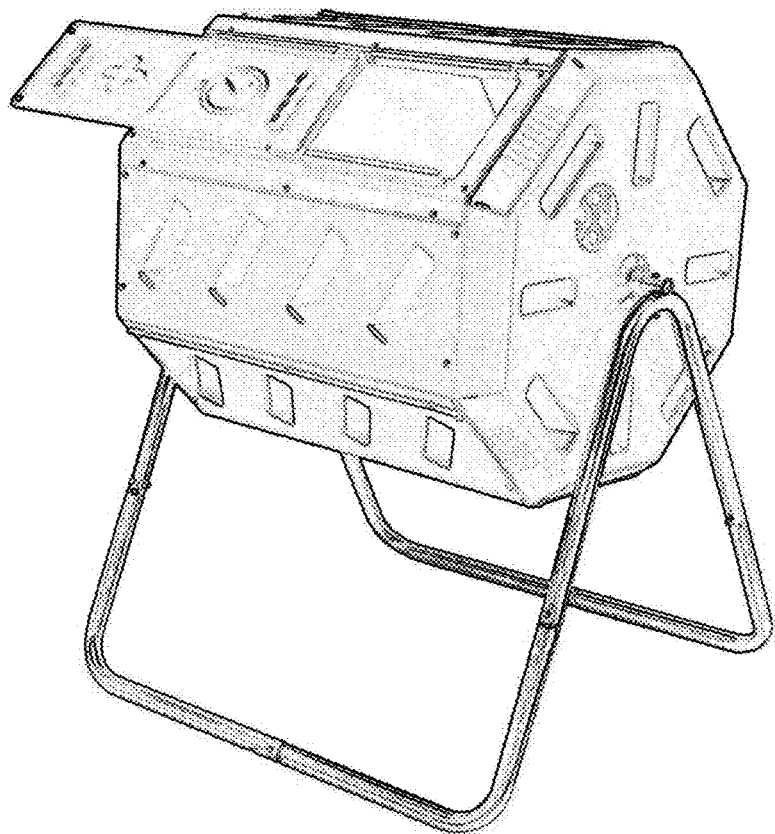
FIG. 1 is a perspective view of a conventional composter.

The drawings, described above, are provided for purposes of illustration, and not of limitation, of the aspects and features of various examples of embodiments of the invention described herein. The drawings are not intended to limit the scope of the claimed invention in any aspect. For simplicity and clarity of illustration, elements shown in the drawings have not necessarily been drawn to scale and the dimensions of some of the elements may be exaggerated relative to other elements for clarity.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 2:
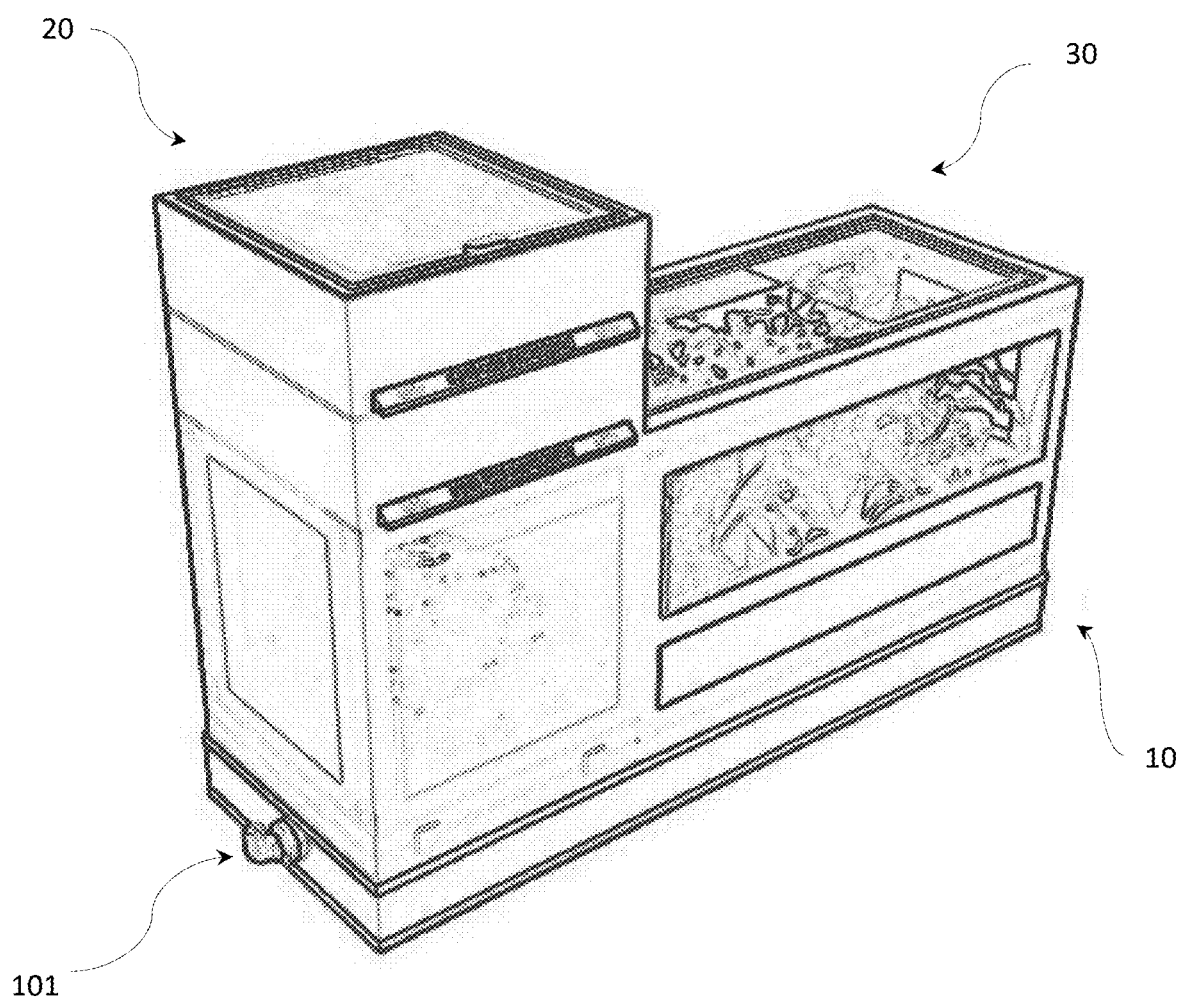
FIG. 2 is a perspective view of a compost and planting system according to a preferred embodiment of the present invention.
Figure 3:
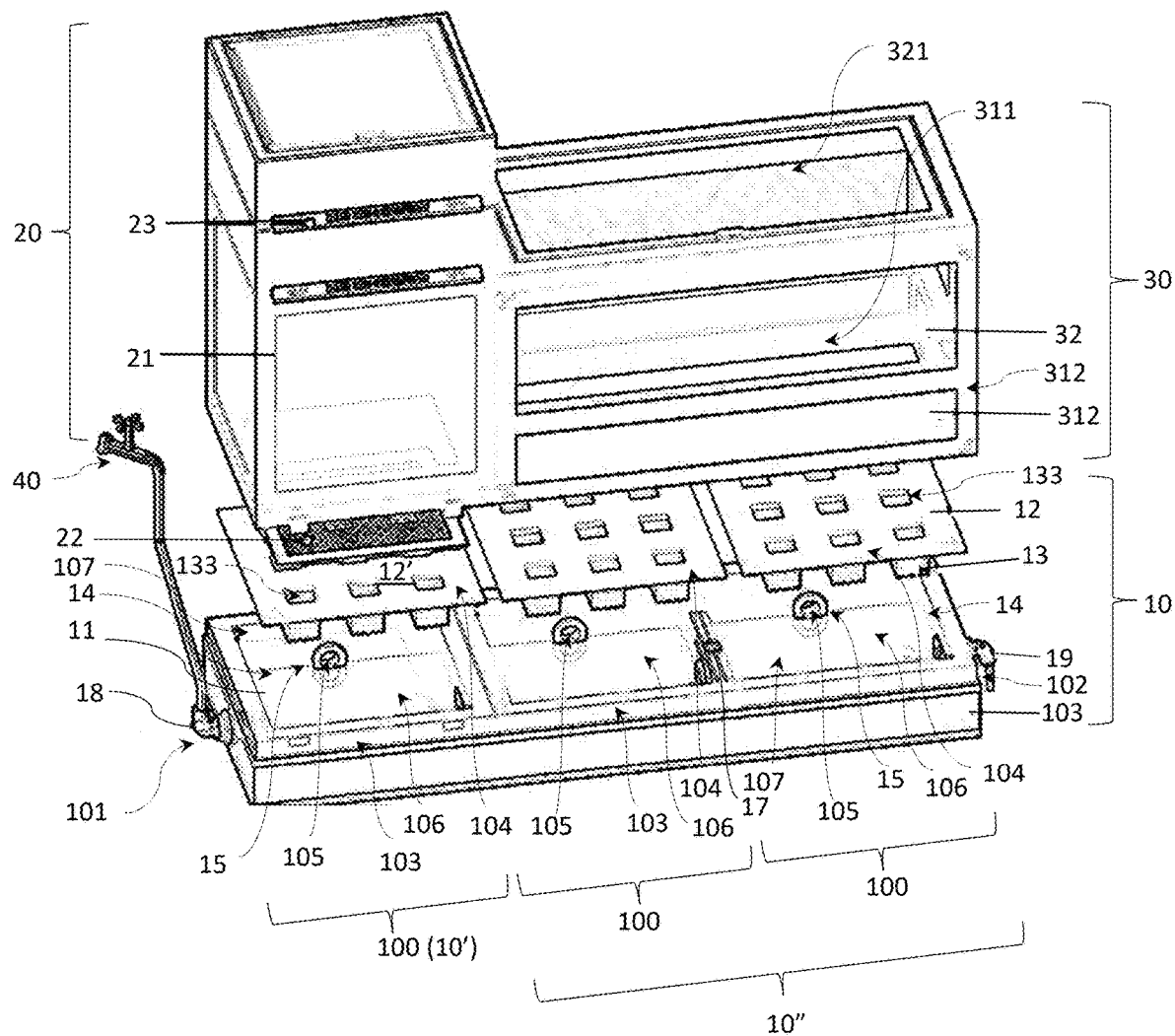
FIG. 3 is a partial exploded view of the compost and planting system according to the above preferred embodiment of the present invention.
Figure 4:
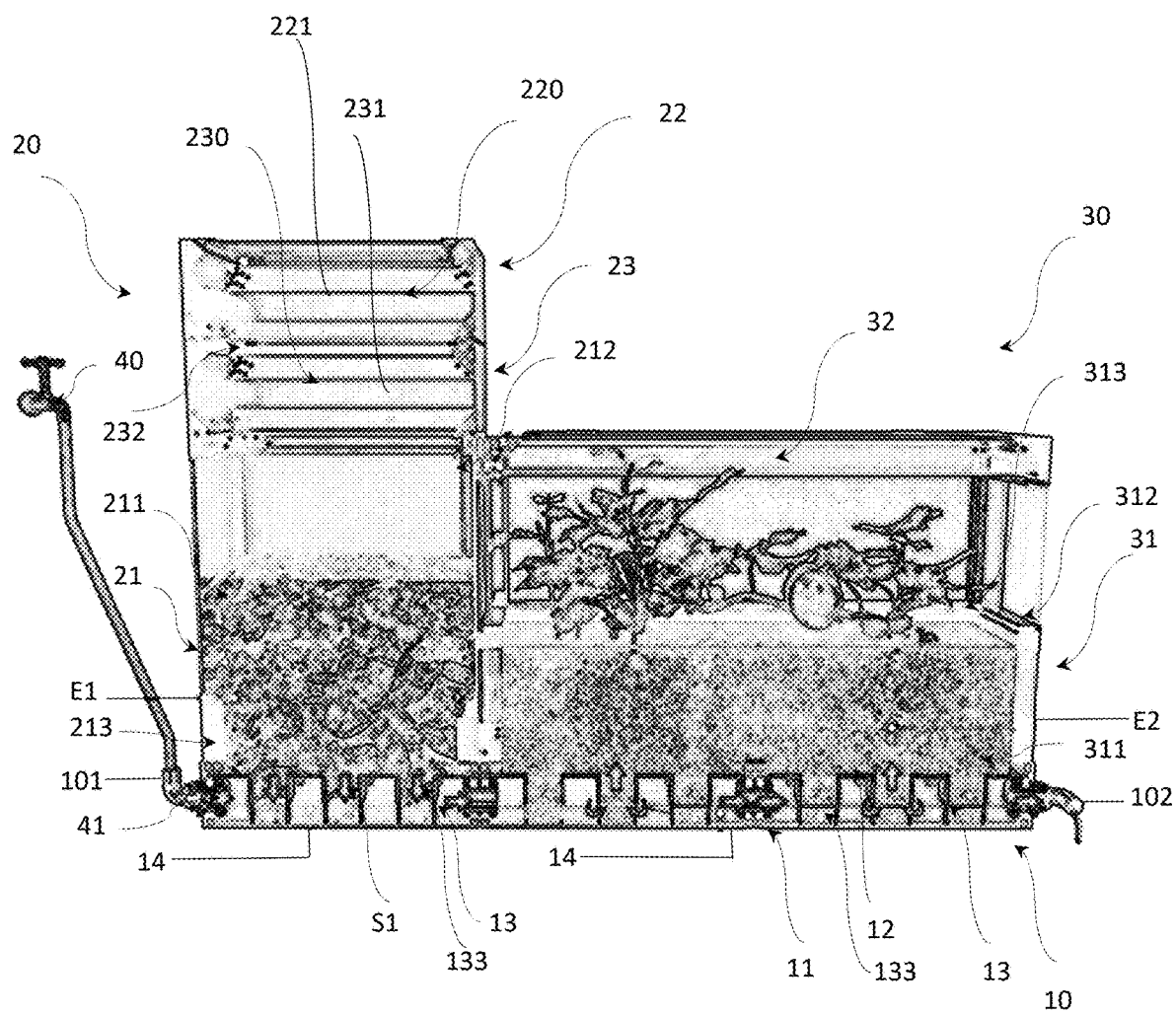
FIG. 4 is a partial sectional view of the compost and plating system according to the above preferred embodiment of the present invention.

Referring to FIG. 2 to FIG. 4, a compost and planting system according to a preferred embodiment of the present invention is illustrated, which comprises an air-water source arrangement 10, a composter arrangement 20 and a planting arrangement 30.

The air-water source arrangement 10, which has a liquid inlet 101 and a liquid outlet 102, comprises a bottom wall 11, a base wall 12 and a plurality of tubular circulation hubs 13 spacedly supported between the bottom wall 11 and the base wall 12, wherein an air-water flowing chamber 14 is defined between the bottom wall 11 and base wall 12 while the liquid inlet 101 and the liquid outlet 102 communicating with the air-water flowing chamber 14 for inletting liquid into the air-water flowing chamber 14 and outletting liquid in the air-water flowing chamber 14 to outside, as shown in FIG. 4.

Figure 5A:
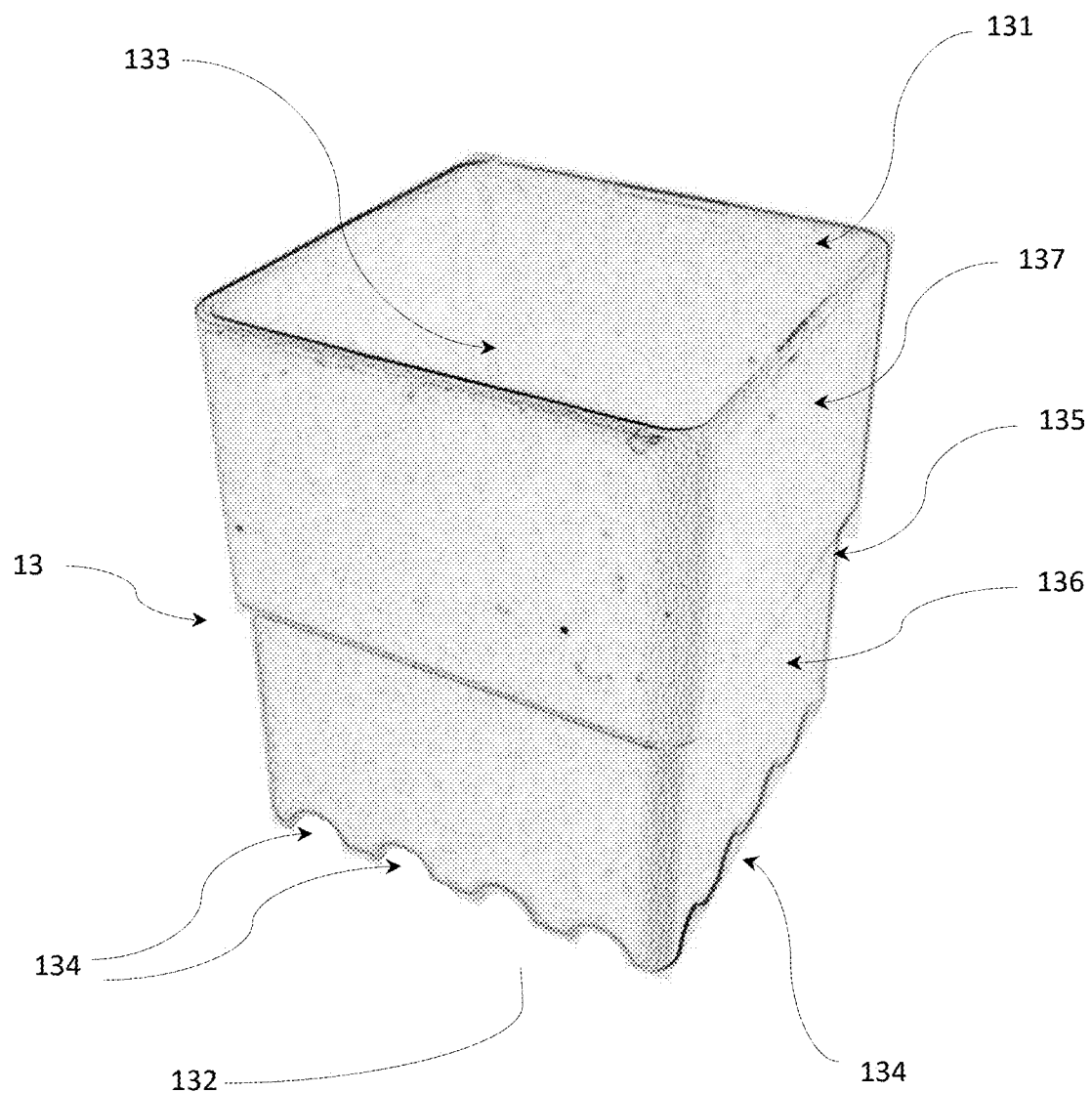
FIG. 5A is a top perspective of the circulation hub of the compost and planting system according to the above preferred embodiment of the present invention.
Figure 5B:
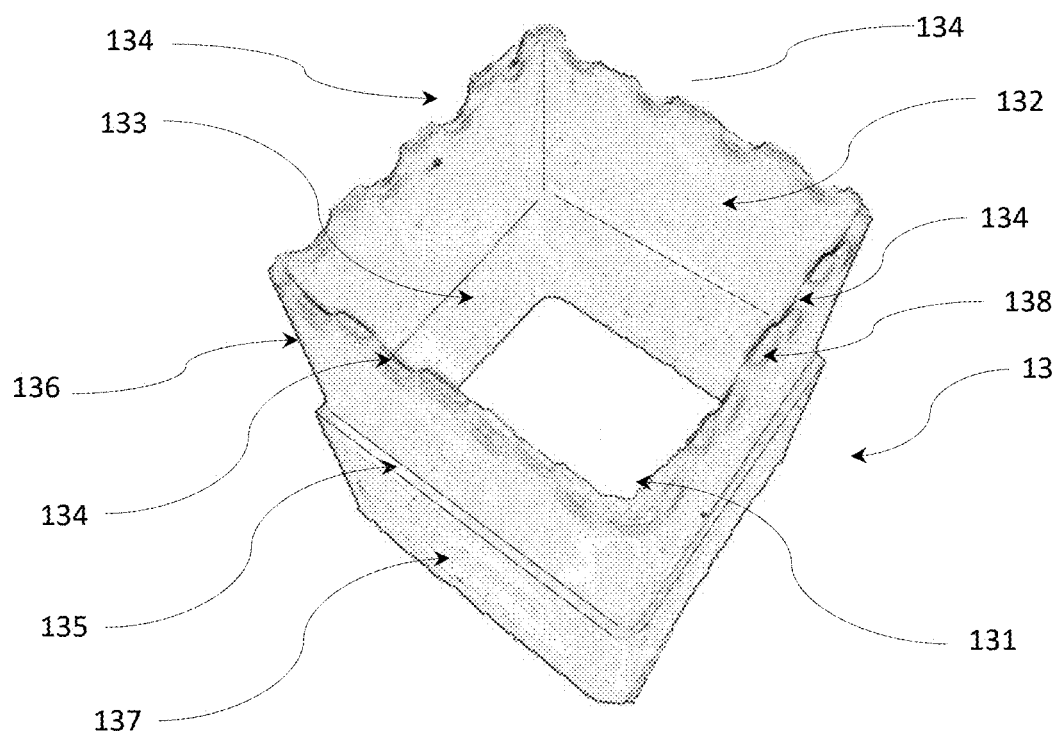
FIG. 5B is a bottom perspective view of the circulation hub of the compost and planting system according to the above preferred embodiment of the present invention.

Each of the circulation hubs 13, as shown in FIG. 5A and FIG. 5B, has an upper opening end 131, a lower opening end 132, a hub cavity 133 defined between the upper opening end 131 and the lower opening end 132, and a plurality of liquid slots 134 spacedly formed around the lower opening end 132 communicating the hub cavity 132 with the air-water flowing chamber 12.

The composter arrangement 20 comprises a composting container 21, which is mounted on the air-water source arrangement 10 and configured for containing disposed organic waste E1 for composting, having a filtering bottom 22 positioned on at least a first portion 12' of the base wall 12 of the air-water source arrangement 10, as shown in FIG. 3 and FIG. 4.

The planting arrangement 30 comprises at least a soil tub 31, which mounted on the air-water source arrangement 10, having a bottom opening 311 communicating with the hub cavities 133 of the circulation hubs 13 of the air-water source arrangement 10, wherein a planting soil E2 is filled in the soil tub 31 and the hub cavities 133 are positioned below the bottom opening 311 of the soil tub 31, as shown in FIG. 3 and FIG. 4.

Thereby, as shown in FIGS. 4, 5A and 5B, a sewage S1 produced from the organic waste E1 contained in the composting container 21 during decomposition is drained into the circulation hubs 13 positioned below filtering bottom 22 of the composter arrangement 20 and flows into the air-water flowing chamber 14 of the air-water source arrangement 10 through the liquid slots 134 of the circulation hubs 13, and that a liquid 41, preferably water from a water source 40 or drain liquid from a sink (not shown), is fed into the air-water flowing chamber 14 of the air-water source arrangement 10 via the liquid inlet 101 to carry the sewage S1 to flow in a lower portion of the air-water flowing chamber 14 while an upper portion of the air-water flowing chamber 14 is remained to have a flow of air, such that the liquid 41 in the lower portion of the air-water flowing chamber 14 enters the circulation hubs 13 through the liquid slots 134 thereof to moisture the planting soil E2 contained in the circulation hubs 13 positioned below the soil tub 31.

Referring to FIGS. 7A to 7C, according to the preferred embodiment, each of the circulation hubs 13 is a square tube having a height of 10 cm and a width of about 8-9 cm. In order to have a strengthen and rigid configuration, a step rim 135 is formed at a middle portion of each circulation hub 13 defining a lower portion 136 having a smaller size and an upper portion 137 having a larger size. The configuration of the step rim 135 also allows the plurality of circulation hubs 13 to be stacking up coaxially by inserting the lower portion 136 of one circulation hub 13 into the upper portion 137 of another circulation hub 13 for ease of storage and transportation.

To ensure the liquid slots 134 being provided at the lowest position of the circulation hub 13, the lower opening end 132 has a wave shape and the liquid slots 134 are semi-circular grooves, each having a diameter of about 1 cm, evenly and spacedly formed along a bottom peripheral edge 138 of the lower opening end 132 of each circulation hub 13. In other words, when the plurality of circulation hubs 13 are laid on the bottom wall 11 of the air-water source arrangement 10, the bottom peripheral edge 138 of each circulation hubs 13 is in contact with the bottom wall 11 and the liquid slots 134 form semi-circular apertures communicating the hub cavities 133 with the air-water flowing chamber 14. When planting soil E2 is disposed in the hub cavities 133, the size of the liquid slots 134 is preferred to be arranged in such manner that the weight of the planting soil E2 in the soil tub 31 and the hub cavity 133 avoids the particles of the planting soil coming off to the air-water flowing chamber 14 through the liquid slots 134 while the liquid in the air-water flowing chamber 133 is capable of permeating into the planting soil E2 in the hub cavities 133 of the circulation hubs 13. The tubular configuration of the circulation hubs 13 enables continuous circulation of the water moisture permeating into the hub cavities 133 of the circulation hubs 13 and circulating upwards into the planting soil contained in the soil tub 31 that provides a steadily and sufficient supply of water to the vegetables or plants planting in the soil tub 31 of the planting arrangement 30.

Figure 9:
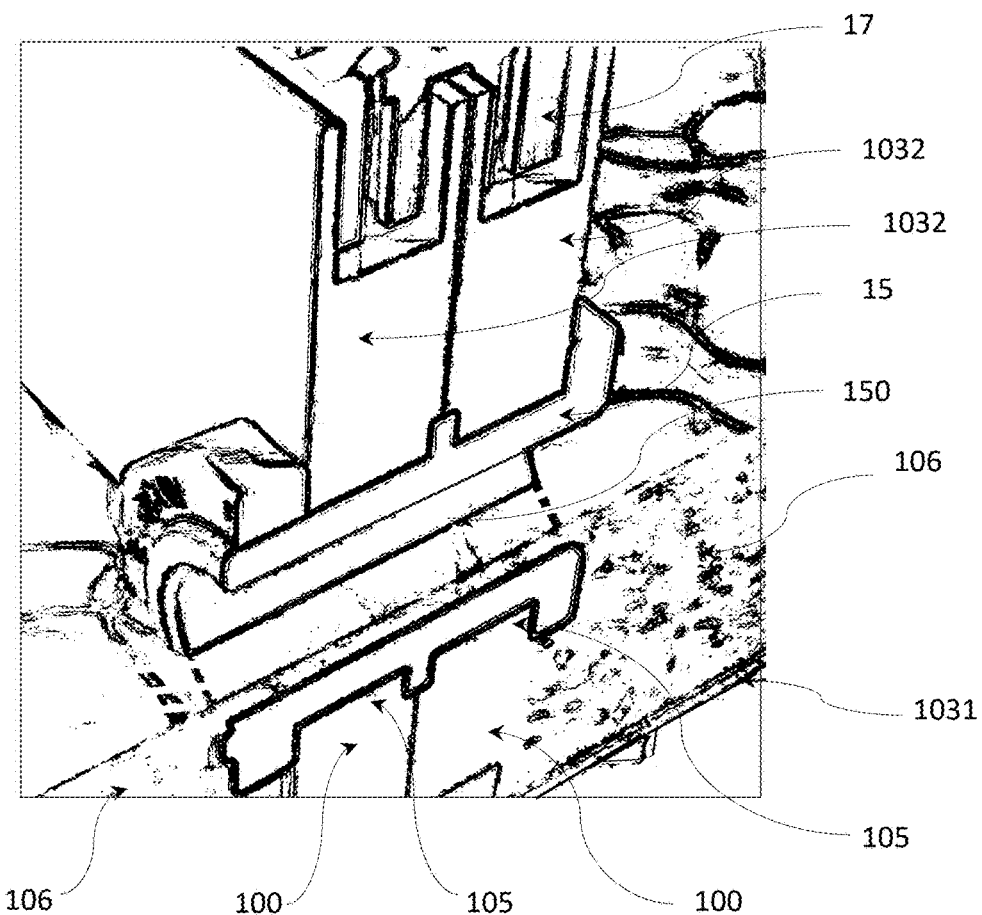
FIG. 9 is a partial perspective view illustrating the circulation joint of the air-water source arrangement of the compost and planting system according to the above preferred embodiment of the present invention.

Referring to FIG. 3, according to the preferred embodiment, the air-water source arrangement 10 is preferred to be configured in a modularization manner, wherein the air-water source arrangement comprises one or more air-water circulation modules 100 each comprising an air-water basin 103, a base platform 104 and a predetermined number of the circulation hubs 13. The air-water basin 103 is preferred to be configured as a cubic tray having four sides and three circulation holes 105 formed in middle positions of three of the four sides respectively, wherein each of the circulation hole 105 is sized and configured to sealingly mount a tubular circulation joint 15, as shown in FIG. 3 and FIG. 9. The air-water basin 103 comprises a basin bottom wall 1031 and a basin surrounding wall 1032 upwardly extended from a peripheral edge of the basin bottom wall 1031 to define an air-water chamber 106 therein and a top opening 107. The base platform 104 is sized and configured to be supported in the air-water chamber 106 and cover the top opening 107.

For example, the air-water source arrangement 10 is configured by three air-water circulation modules 100 aligned in a side-by-side manner, as shown in FIG. 3. A shown in FIG. 9, connectors 17 are used to connect two adjacent sides of the two surrounding walls 1032 of the two adjacent air-water circulation module 100 rigidly and firmly together to form the air-water source arrangement 10. Since the air-water circulation modules 100 are standardized in size and configuration, the circulation holes 105 of each side of the surrounding walls 1032 are aligned coaxially and the circulation joint 15, as shown in FIG. 9, is configured to not only further mount the two adjacent surrounding walls 1032 together but also provide a circulation channel 150 between the air-water chambers 106 of the two adjacent air-water circulation modules 100 allowing liquid flowing therethrough. Referring to FIG. 3, a first (leftward) air-water circulation module 100 functions as an air-water circulation arrangement 10', wherein an inlet liquid connector 18 is mounted at one of the circulation holes 105 thereof to connect with the water source 40 and function as the liquid inlet 101 for inletting liquid into the air-water chamber 106 of the first air-water circulation module 100 (air-water circulation arrangement 10'). A second (middle) air-water circulation module 100 is connected with the first air-water circulation module 100 by the connectors 17 and the circulation joint 15 such that the liquid in the air-water chamber 106 of the first air-water circulation module 100 is able to flow into the air-water chamber 106 of the second air-water circulation module 100 through the circulation channel 150 between the first and second air-water circulation modules 100. A third (rightward) air-water circulation module 100 is connected with the second air-water circulation module 100 by the connectors 17 and the circulation joint 15 such that the liquid in the air-water chamber 106 of the second air-water chamber 106 of the air-water chamber 106 of the third air-water circulation module 100, wherein an outlet liquid connector 19 is mounted at one of the circulation holes 105 thereof to connect with the water source 40 and function as the liquid outlet 102 for outletting liquid from the third air-water circulation module 100, wherein the liquid in the air-water chamber 106 of the second air-water circulation module 100 is able to flow into the air-water chamber 106 of the third air-water circulation module 100 through the circulation channel 15 between the second and third air-water circulation modules 100.

Thereby, two circulation holes 105 of the first air-water circulation module 100 are configured to be the liquid inlet 101 and the circulation channel 15 between the first and second air-water circulation modules 100. Two circulation holes 105 of the second air-water circulation module 100 are configured to be the circulation channels 15 between the second air-water circulation module 100 and the first and second air-water circulation modules 100 respectively. Two circulation holes 105 of the third air-water circulation module 100 are configured to be the liquid outlet 102 and the circulation channel 15 between the third air-water circulation module 100 and the second air-water circulation module 100. When the air-water source arrangement 10 is assembled by the first, second and third air-water circulation modules 100 only, the third circulation hole 105 of each of the first, second and third air-water circulation modules 100 is sealedly closed. Accordingly, the air-water chambers 106 of the first, second and third air-water circulation modules 100 and the two circulation channels 15 respectively communicating the first air-water module 100 with the second air-water module 100 and the second air-water module 100 with the third air-water module 100 form the air-water flowing chamber 14 of the air-water source arrangement 10 assembled by the first, second and third air-water circulation modules 100 according to the preferred embodiment as shown in FIG. 2 to FIG. 4.

Figure 10:
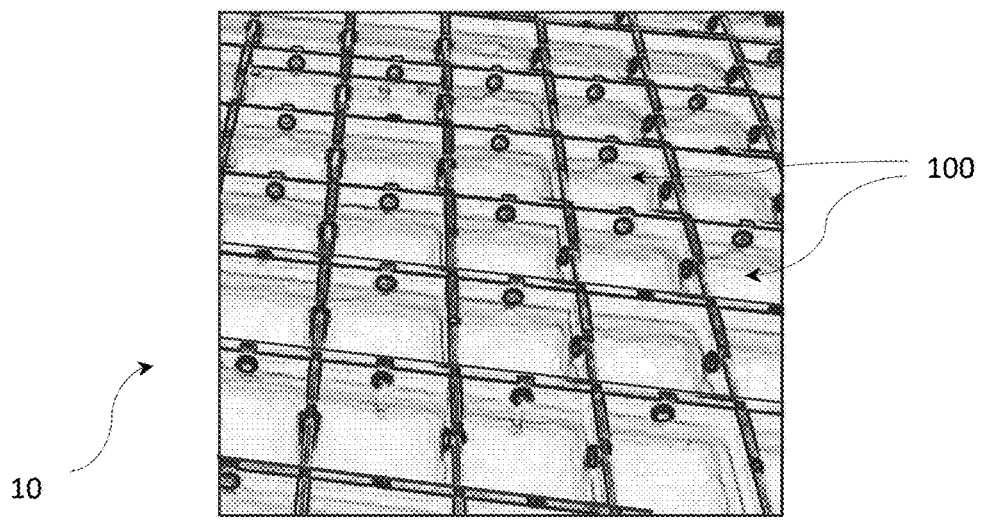
FIG. 10 is a partial perspective view illustrating an alternative mode of the air-water source arrangement of the compost and planting system according to the above preferred embodiment of the present invention.

Alternatively, more air-water circulation modules 100 can be connected with the first, second and third air-water circulation modules 100 to assemble a bigger air-water source arrangement 10, as shown in FIG. 10, wherein the third circulation hole 105 is used to connected with another circulation hole 105 of the adjacent air-water circulation module 100 to form the circulation channel 15 therebetween. In other words, the user may assemble multiple air-water circulation modules 100, as shown in FIG. 10, to form the air-water source arrangement 10 with required size, wherein one of the circulation hole 105 of one of the assembled air-water circulation modules 100 positioned at a side of the air-water source arrangement 10 is functioned as the liquid inlet 101 and one of the circulation hole 105 of another assembled air-water circulation modules 100 positioned at an opposing side of the air-water source arrangement 10 is functioned as the liquid outlet 102. The arrangement of the circulation channels 15 of each air-water circulation module 100 with the adjacent air-water circulation modules 100 substantially controls the flow of liquid contained in the air-water chamber 106 of each air-water circulation module 100 to the adjacent air-water chambers 106 of the adjacent air-water circulation modules 100 and thus form the air-water flowing chamber 14 of the air-water source arrangement 10.

Figure 6:
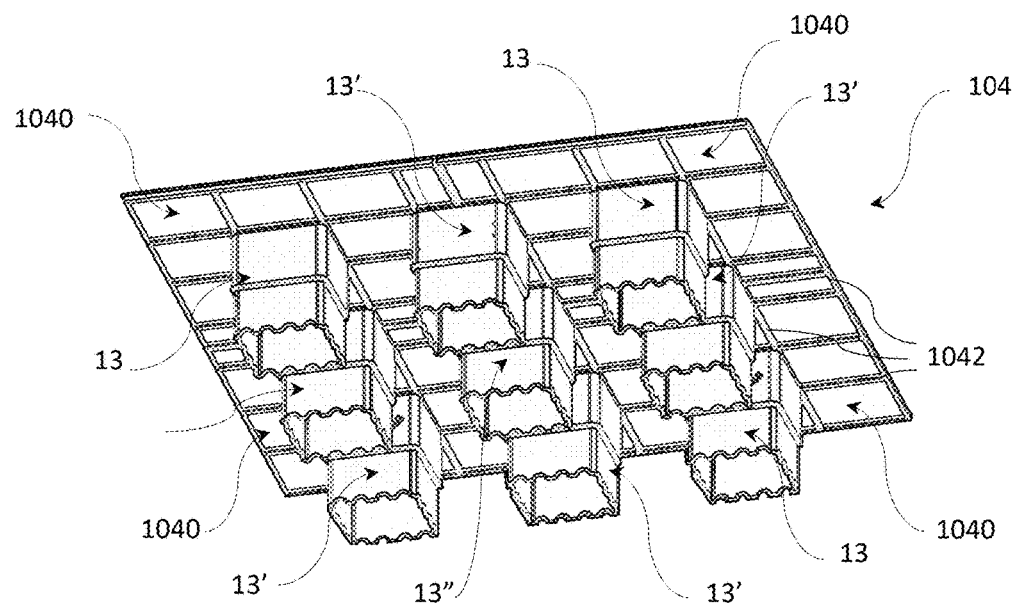
FIG. 6 is a perspective view of an assembly of a base platform and a plurality of circulation hubs of the compost and planting system according to the above preferred embodiment of the present invention.
Figure 7:
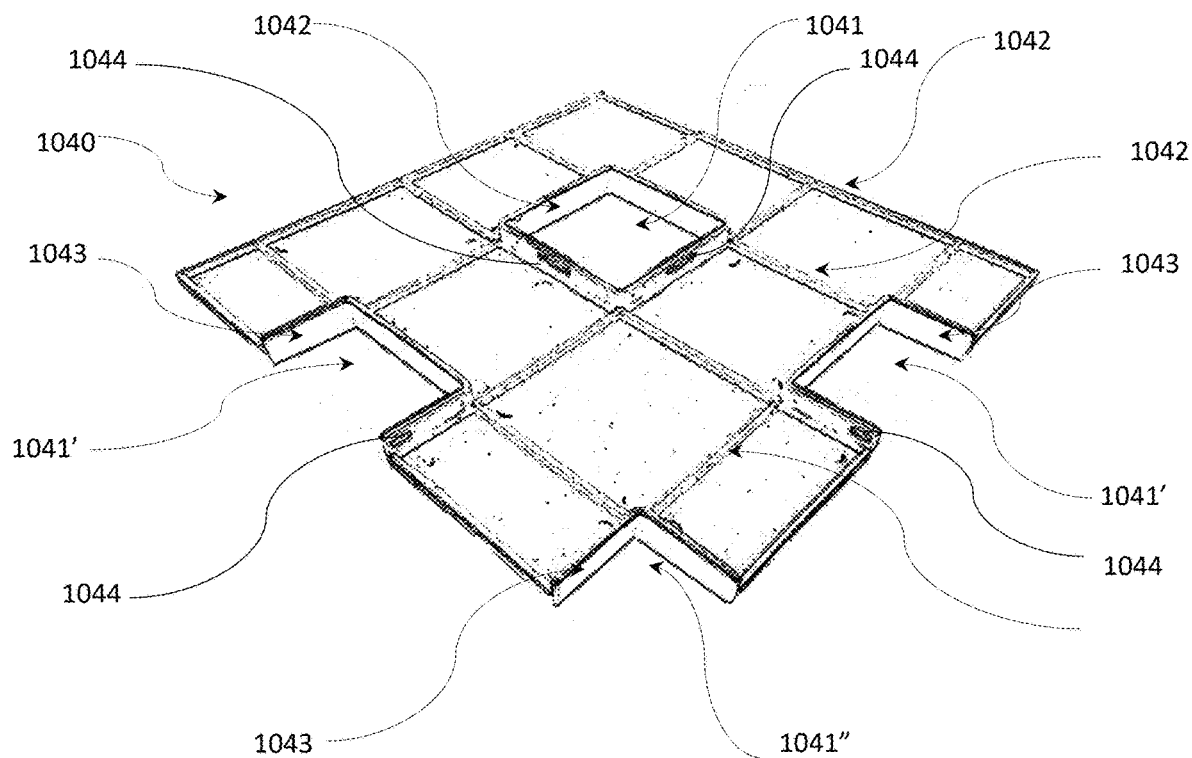
FIG. 7 is a perspective view of a base panel of the base platform of the compost and planting system according to the above preferred embodiment of the present invention.

Referring to FIG. 6 to FIG. 8B, the base platform 104 can be made of a reinforced plastic panel which has a plurality of hub openings 1041 therein and a square shape sized to fittingly cover the top opening 107 of each of the air-water circulation module 100, so as to define the air-water chamber 106 thereof between the basin bottom wall 1031 and the base platform 104. According to the preferred embodiment, the base platform 104 comprises four square shaped section panels 1040 as shown in FIG. 7, which are configured to be aligned side-by-side to form the base platform 104 as shown in FIG. 6. Each section panel 1040 has a full hub opening 1041, two half hub opening 1041' at first and second sides thereof and a quarter hub opening 1041" at a corner of the first and second sides. As shown in FIG. 7, a plurality of reinforcing griding ribs 1042 is protruded on a bottom surface of each section panel 1040 and mounting flanges 1043 are downwardly extended from the bottom surface of each sectional panel 1040 around the full hub opening 1041, the half hub openings 1041' and the quarter hub opening 1041". Accordingly, as shown in FIG. 6 and FIG. 7, when two section panels 1040 are aligned side-by-side, two half hub openings 1041' of two adjacent section panels 1040 form a full hub opening 1041, and that when four section panels 1040 are aligned side-by-side, the four quarter hub openings 1041" of the four section panels 1040 form a full hub opening 1041.

Figure 8A:
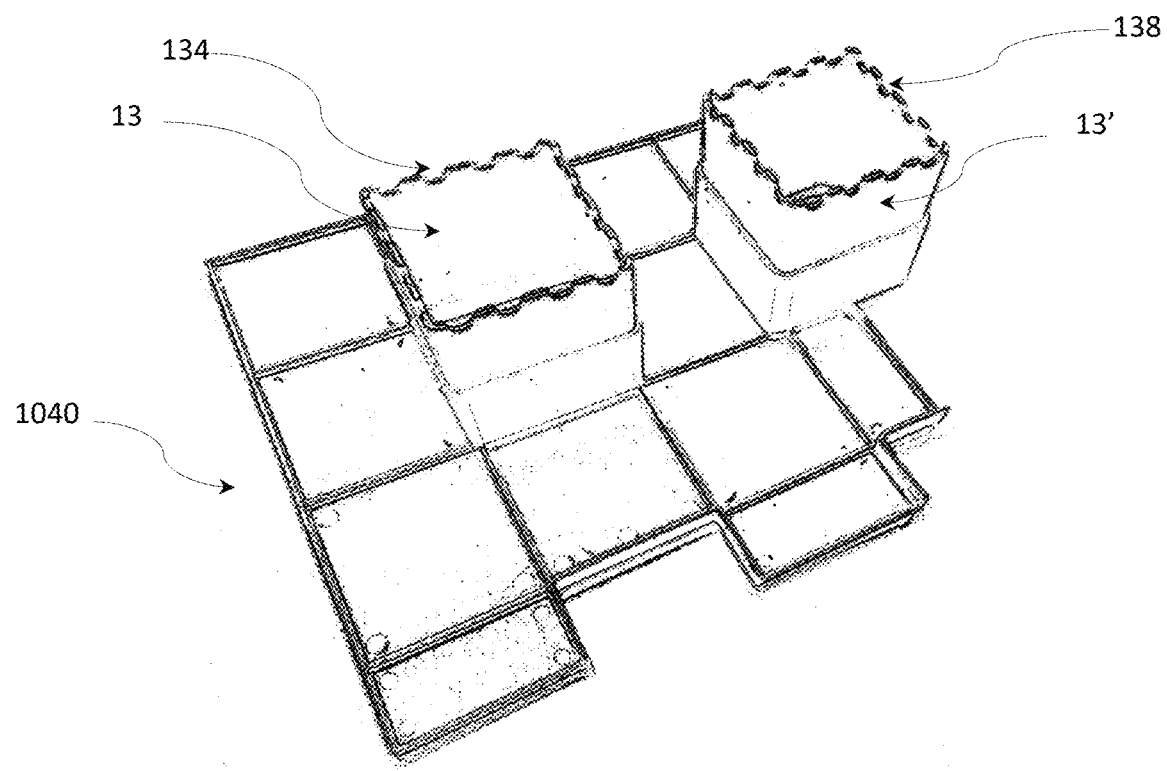
FIG. 8A is a perspective view illustrating an assembly of the circulation hub with the base panel of the compost and planting system according to the above preferred embodiment of the present invention.
Figure 8B:
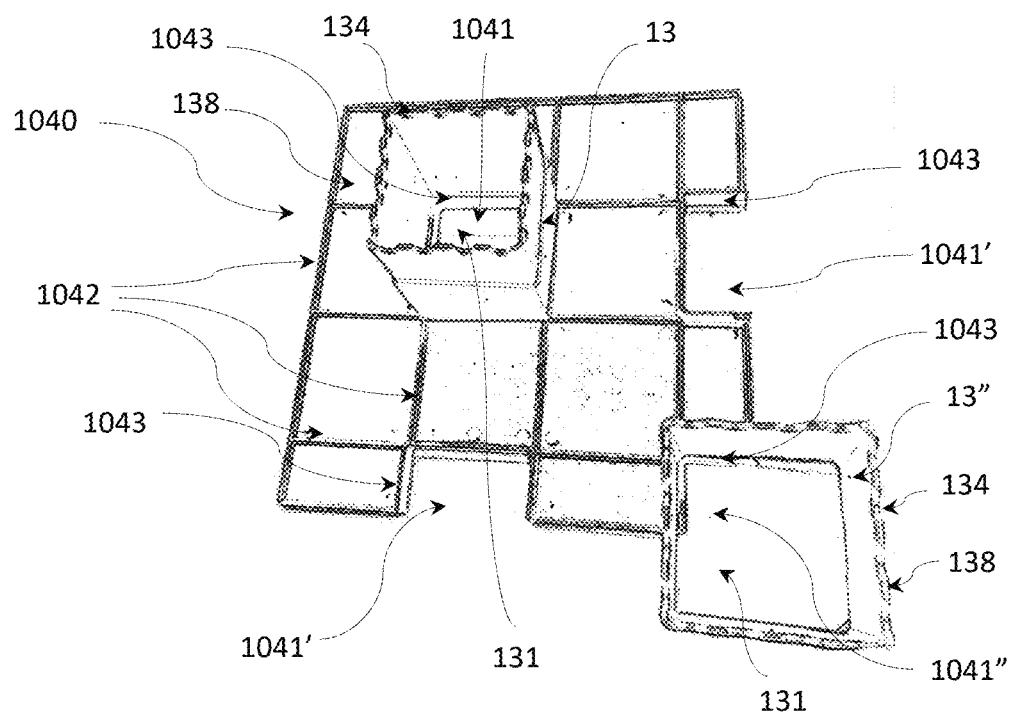
FIG. 8B is another perspective view illustrating an assembly of the circulation hub with the base panel of the compost and planting system according to the above preferred embodiment of the present invention.

Referring to FIG. 6 to FIG. 8B, the circulation hubs 13 are connected below the section panel 1040 by inserting the mounting flanges 1043 into the upper opening ends 131 of the circulation hubs 13 respectively, such that the four section panels 1040 are steadily and evenly supported at the top opening 107 of the air-water circulation module 100 to cover the air-water chamber 106 thereof by nine circulation hubs 13, 13', 13" spacedly sitting on the basin bottom wall 1031 of the air-water basin 103, wherein the circulation hub 13' positioned between two section panels 1040, as shown in FIG. 6 and FIG. 8A, receiving the mounting flanges 1043 extended from two half hub openings 1041' so as to function as a connection hub to support and connect the two side-by-side adjacent section panels 1040. Similarly, the upper opening end 131 of the circulation hub 13" positioned between four sectional panels 1040, as shown in FIG. 6 and FIG. 8B, receiving the mounting flanges 1043 extended from the four quarter hub openings 1041" so as to functions as a central connection hub to support and connect the four section panels 1040 to form a central support and connection at center portion of the base platform 104.

Figure 5C:
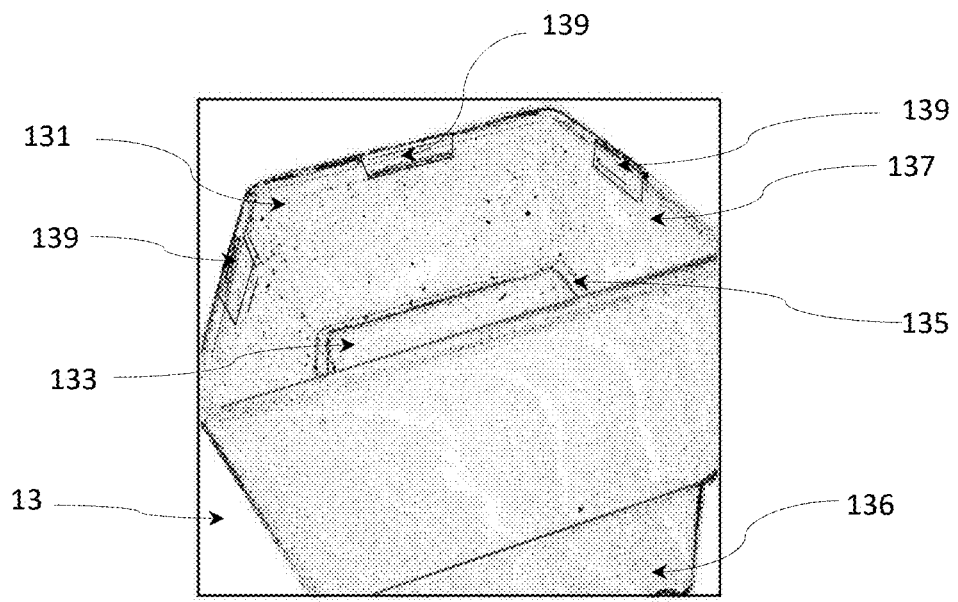
FIG. 5C is an enlarged view of the top opening end of the circulation hub of the compost and planting system according to the above preferred embodiment of the present invention.

To ensure firm and rigid connection between the circulation hubs 13 and the section panels 1040 of the base platform 104, an outer surface of each mounting flange 1043 has an engaging rib 1044 protruded thereon, as shown in FIG. 7, and an engaging groove 139 is indented at each inner surface of the upper opening end 131 of each of the circulation hub 13, as shown in FIG. 5C, such that when mounting flange 1043 is inserted into the upper opening end 131 of the circulation hub 13, the engaging rib 1044 is engaged with the corresponding engaging groove 139 fittingly and securely.

Accordingly, the upper opening ends 131 of the predetermined number of the circulation hubs 13 are fittingly mounted at the circulation holes 1041 of the base platform 104 respectively such that the predetermined number of the circulation hubs 13 is extended downwardly from the circulation holes 1041 of the base platform 104 respectively until the lower opening ends 132 of the circulation hubs 13 support on the basin bottom wall 1031 of the air-water basin 103 while the hub cavities 133 communicating with the circulation holes 1041 respectively, and that the predetermined number of the circulation hubs 13 significantly support the base platform 104 above the basin bottom wall 1031 within the air-water basin 103.

It is worth mentioning that the configurations of the circulation hub 13 and the base panel 1040 allow them to be made by injection molding for mass production with standard size and rigid structure for precise and firm connection and assembly.

In view of above, the basin bottom walls 1031 of the air-water basin 103 of the air-water circulation modules 100 combine to form the bottom wall 11 of the air-water source arrangement 10, the base platforms 104 of the air-water circulation modules 100 combine to form the base wall 12 of the air-water source arrangement 10, and the spaces defined between the basin bottom walls 1031 and the base platforms 104 and around the circulation hubs 13 and the circulation channels 150 combine to form the air-water flowing chamber 104 of the air-water source arrangement 10.

It is worth mentioning that the predetermined number of the circulation hubs 13 is the same number of the circulation holes 105, wherein each of the predetermined number of the circulation hubs 13 is supported between the base platform 104 and the basin bottom wall 1031 of the air-water basin 103, wherein the upper opening ends 131 of the predetermined number of the circulation hubs 13 are fittingly mounted at the circulation holes 105 of the base platform 104 respectively such that the predetermined number of the circulation hubs 13 is extended downwardly from the circulation holes 105 of the base platform 104 respectively until the lower opening ends 132 of the circulation hubs 13 support on the basin bottom wall 1031 of the air-water basin 103 while the hub cavities 133 communicating with the circulation holes 105 respectively, and that the predetermined number of the circulation hubs 13 significantly support the base platform 104 above the basin bottom wall 1031 within the air-water basin 103.

Two circulation holes 105 of each of the air-water circulation module 100 form an inlet opening and an outlet opening thereof respectively, wherein the circulation joint 15 is configured to be sealedly mounted between the outlet opening of the air-water circulation module 100 and the inlet opening of another adjacent air-water circulation module 100 to form the circulation channel 150 between the two adjacent air-water circulation modules 100.

It is appreciated that, referring to FIG. 3, FIG. 4 and FIG. 9, according to the preferred embodiment, the air-water chamber 106 of each air-water circulation module 100 of the air-water source arrangement 10 is controlled to be not fully filled with liquid. In other words, only lower portions of the air-water chambers 106 of the air-water circulation modules 100 of the air-water source arrangement 10 is filled with liquid while upper portions of the air-water chambers 106 of the air-water circulation modules 100 of the air-water source arrangement 10 have to be maintained to fill with air. Therefore, while water moisture is supplied to the planting soil E2 in the soil tub 31 and the hub cavities 133 through the liquid slots 134 of each circulation hub 13, air is supplied to the planting soil in the soil tub 31 through the upper opening ends 131 of the circulation hubs 13 and the hub openings 1041 of the base platforms 104 of the base wall 12. In other words, both the liquid and the air are flowing in the air-water chambers 106 and the circulation channels 150 of the air-water flowing chamber 14 for air and water circulation to the planting soil E2 contained in the soil tub 31.

The lower liquid and upper air flowing in the air-water chambers 106 and the circulation channels 150 can be controlled by installing probes in one or more of the air-water chambers 106 or in the circulation channels 150 to detect the water level therein. Alternatively, the liquid inlet 101 could be arranged to communicate with a lower portion of the air-water flowing chamber 14 while the liquid outlet 102 is arranged to communicate with an upper portion of the air-water flowing chamber 14 to discharge liquid so as to prevent liquid filling up the upper portion of the air-water flowing chamber 14 to ensure air circulation.

According to the preferred embodiment, the circulation channels 150 are also preferred to be formed at a middle portion of the surrounding walls 1032, as shown in FIG. 9, so that when a height of the liquid in one air-water chamber 106 reaches the circulation channel 150, the liquid will flow to an adjacent air-water chamber 106 of another air-water circulation module 100 and finally flow out the air-water source arrangement 10 through the liquid outlet 102. Therefore, a lower liquid layer and an upper air layer are maintained in the air-water chamber 106 of each air-water circulation module 100.

Referring to FIG. 3 and FIG. 4, according to the preferred embodiment, the composter arrangement 20 is mounted on top of the first (leftward) air-water circulation module 100 which becomes and functions as the air-water circulation arrangement 10' to collect sewage produced during composting of the organic waste E1 contained in the composting container 21 of the composter arrangement 20 while allowing air ventilation therethrough to ensure effective and efficient decomposition of the organic waste E1 in the composting container 21.

As shown in FIG. 4, the composting container 21 comprises a square tubular frame having four side walls defining a composting chamber 211 therein, a top composting opening 212 and a bottom composting opening 213, wherein the organic waste E1 disposed through the top composting opening 212 into the composting chamber 211 has larger size with air trapped therein. During the decomposing of the organic waste E1, sewage produced from the decomposing organic waste E1 flows down into the hub cavities 133 of the circulation hubs 13 and flow into the air-water chamber 106 of the air-water circulation arrangement 10' (the first air-water circulation module 100 according to the preferred embodiment) through the circulation slots 134 (as shown in FIG. 5A) of the circulation hubs 13.

As shown in FIG. 3, the filtering bottom 22 is embodied as a net frame sized and configured to cover the bottom composting opening 213 of the composting container 21 and place on top of the first portion 12' of the base wall 12, i.e. the base platform 133 of the first air-water circulation module 100 functioning as the air-water circulation arrangement 10', for filtering particles of the decomposing organic waste E1 larger than the mesh size of the filtering bottom 22 and merely allowing the liquid form sewage to flow into the hub cavities 133 of the circulation hubs 13 of the air-water circulation arrangement 10' (the first air-water circulation module 100).

According to the preferred embodiment, the composting container 21 is embodied to have the composting chamber 211 sized for decomposing around 4500 kgs per year (approximately 6-7 kgs per day). However, by means of the composting and planting system of the present invention, organic waste likes fruits and vegetables can be decomposed in one week and organic waste likes egg shells and bones can be decomposed in one to three months without the need of any additive such as bacteria agent. Since water and air are both sufficiently supplied in the composting container 21, the organic waste E1 disposed in the composting chamber 211 of the composting container 21 is composted into approximately 5% compost and 95% liquid sewage. Accordingly, the newly disposed organic waste poured to the top of the organic waste E1 contained in the composting container 21 gradually decomposes along time with the air and the water content of organic waste and the water moisture supplied by the liquid in the air-water chamber 106 of the air-water circulation arrangement 10' and falls down to have higher density until it becomes compost with highest density at the lower portion of the composting container 21. In other words, the containing space of the composting chamber 211 will increase in the composting container 21 everyday for taking new organic waste while the organic waste decomposing and accumulating more densely and closer to the filtering bottom 22.

Referring to FIG. 3 and FIG. 4, according to the preferred embodiment, the planting arrangement 30 is mounted on top of the second and third air-water circulation modules 100 which become and function as a bottom-up air-water circulation and irrigation arrangement 10" to naturally irrigate vegetable or plants planting in the soil tub 31 of the planting arrangement 30. The liquid and sewage produced from the water content of the organic waste E1 during composting in the composting container 21 and dropping into the air-water chamber 106 of the air-water circulation arrangement 10' will flow with the liquid flowing in through the liquid inlet 101 to the air water chambers 106 of the bottom-up air-water circulation and irrigation arrangement 10" (i.e. the second and third air-water circulation modules 100) to be absorbed by planting soil E2 contained in the hub cavities 133 of the circulation hubs 13 and the soil tub 31 of the planting arrangement 30. Accordingly, no watering to the vegetables or plants planting in the soil tub 31 of the planting arrangement 30 is required because sufficient air and water are supplied by the air and liquid flowing in the air-water chambers 106 of the bottom-up air-water circulation and irrigation arrangement 10" respectively through the circulation holes 1041 of the base platform 104 thereof and the liquid slots 134 of the circulation hubs 13 thereof to irrigate the vegetables and plants planting in the soil tub 31 in a bottom-up manner.

According to the preferred embodiment, the soil tub 31 comprises a rectangular and tubular boundary frame 312 sized and configured to be mounted on top of the second and third air-water circulation modules 100 (the bottom-up air-water circulation and irrigation arrangement 10") of the air-water source arrangement 10. The planting arrangement 30 further comprises an air ventilating net cover box 32 configured to cover the soil tub 31 to protect the vegetables or plants growing therein from inserts and animals. The air ventilating net cover box 32 has a net door 321 hinged on top thereof for opening to access the vegetables and plants in the soil tub 31.

In view of above, it is appreciated that drain liquid from toilet or kitchen sink can be fed into the air-water source arrangement 10 through the liquid inlet 101. The liquid inlet 101 may also simply connected to the water source 40 according to the preferred embodiment to supply water into the air water flowing chamber 14 of the air-water source arrangement 10. Referring to FIG. 3 and FIG. 4, the inlet liquid dilutes the sewage produced from the organic waste E1 contained in the composting container 21 in the air-water chamber 106 of the air-water circulation arrangement 10' of the air-water source arrangement 10, wherein a mixture of the inlet liquid, the biogas and the sewage flows into the air-water chambers 106 of the bottom-up air-water circulation and irrigation arrangement 10" of the air-water source arrangement 10 and is mainly absorbed by the planting soil E2 in the hub cavities 133 and the soil tub 31 to irrigate the vegetables and plants planting in the soil tub 31. In other words, the planting arrangement 30 serves as a device to absorb the sewage and biogas produced by the organic waste E1 during composting in a natural manner so as to eliminate and/or purify sewage to be outlet through the liquid outlet 102 of the air-water source arrangement 10. It is worth mentioning that when sufficient sewage is produced to irrigate the vegetables plants in the soil tub 31, smaller volume of water supply or even no water is required to be supplied to flow in the air-water flowing chamber 14 through the liquid inlet 101. Alternatively, a predetermined amount of water can be supplied by the water source 40 periodically to flow into the air-water flowing chamber 14 to ensure a sufficient flow of liquid for irrigation while less organic waste is required to dispose for the user. Preferably, water level probes may be installed in the air-water chambers 106 to detect the amount of liquid therein, such that when the liquid level within the air-water chambers 106 drops to a predetermined value, a signal is sent to activate the electrical valve of the water source 40 to supply water into the air-water flowing chamber 14 through liquid inlet 101.

Figure 11:
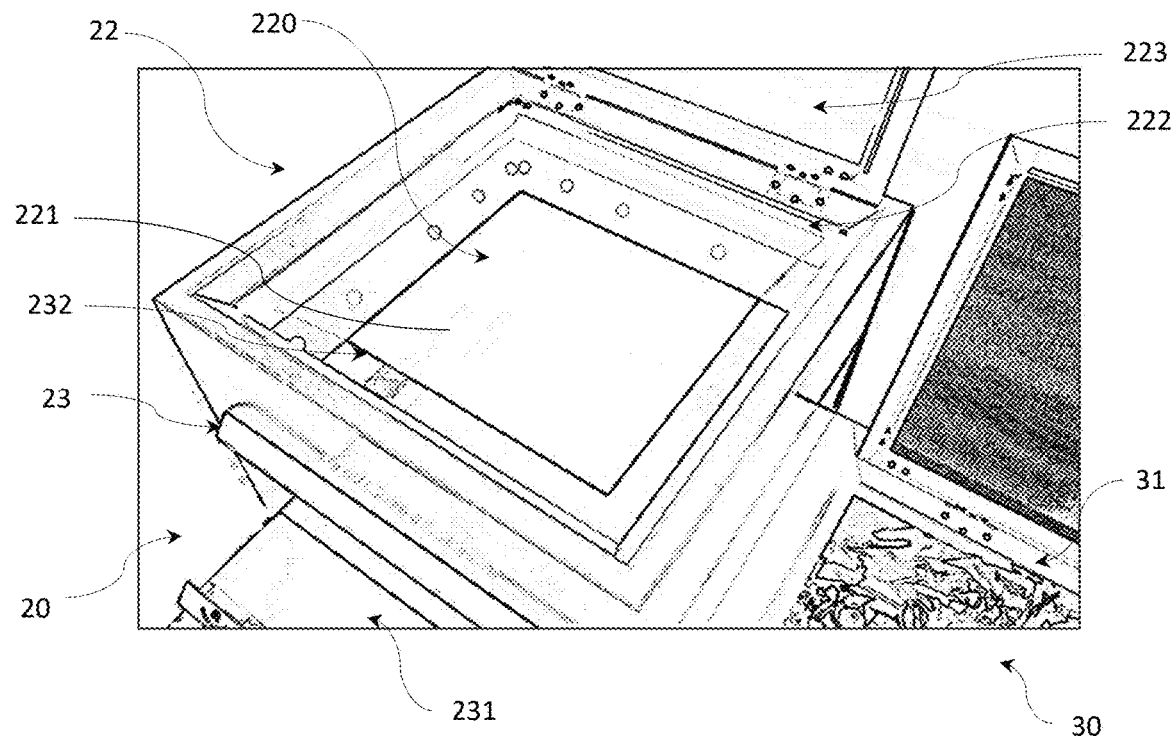
FIG. 11 is a partial perspective view illustrating the collection container of the compost and planting system according to the above preferred embodiment of the present invention.

Referring to FIG. 4 and FIG. 11, in order to significantly avoid odor and flying inserts produced in the composting container 21 being disposed before the user while the using pouring organic waste E1 into the composting container 21, the composter arrangement 20 has a collection chamber 220 isolated from the composting container 31 for the user to dispose organic waste E1 therein, and comprises a collection door 221, which is generally configured to isolate the collection chamber 220 from the composting container 21 so that while the user disposing organic waste in the collection chamber 220, the user is sheltered from the decomposing organic waste E1 within the composting container 21, and is operatable to be opened to allow the organic waste E1 disposed in the collection chamber 220 to transfer into the composting container 21 in an isolated and air-tight manner.

According to the preferred embodiment, the composter arrangement 20 further has an air chamber 230 configured between the collection chamber 220 and the composting container 21 so as to significantly avoid odor produced in the composting container 21 entering the collection chamber 220.

The composter arrangement 20 comprises an isolation door 231, which is generally configured to enclose the top composting opening 212 of the composting container 21. Therefor, the air chamber 230 defined between the collection door 221 and the isolation door 231 is arranged for further isolating the collection chamber 220 from the composting chamber 211 of the composting container 21, so that while the user disposing organic waste in the collection chamber 220, the collection chamber 220 is isolated from the composting container 21 by the air chamber 230 and thus the user is sheltered from the decomposing organic waste E1 within the composting container 21 by the air chamber 230 between the collection chamber 220 and the composting chamber 211. The user may operate the collection door 221 to open to allow the disposed organic waste in the collection chamber 220 to transfer into air chamber 230. Thereafter, the collection door 221 is shut to close the air chamber 230 again and then the isolation door 231 is operable to be opened to allow the organic waste in the air chamber 230 to transfer into the composting chamber 211 of the composting container 21. The isolation door 231 is shut again to enclose the composting chamber 211 of the composting container 21. Accordingly, the organic waste E1 contained in the composting container 21 is consealed from outside through both the air chamber 231 and the collection chamber 220 in an air-tight manner so as to effectively avoid odor and smell from outside.

Figure 12:
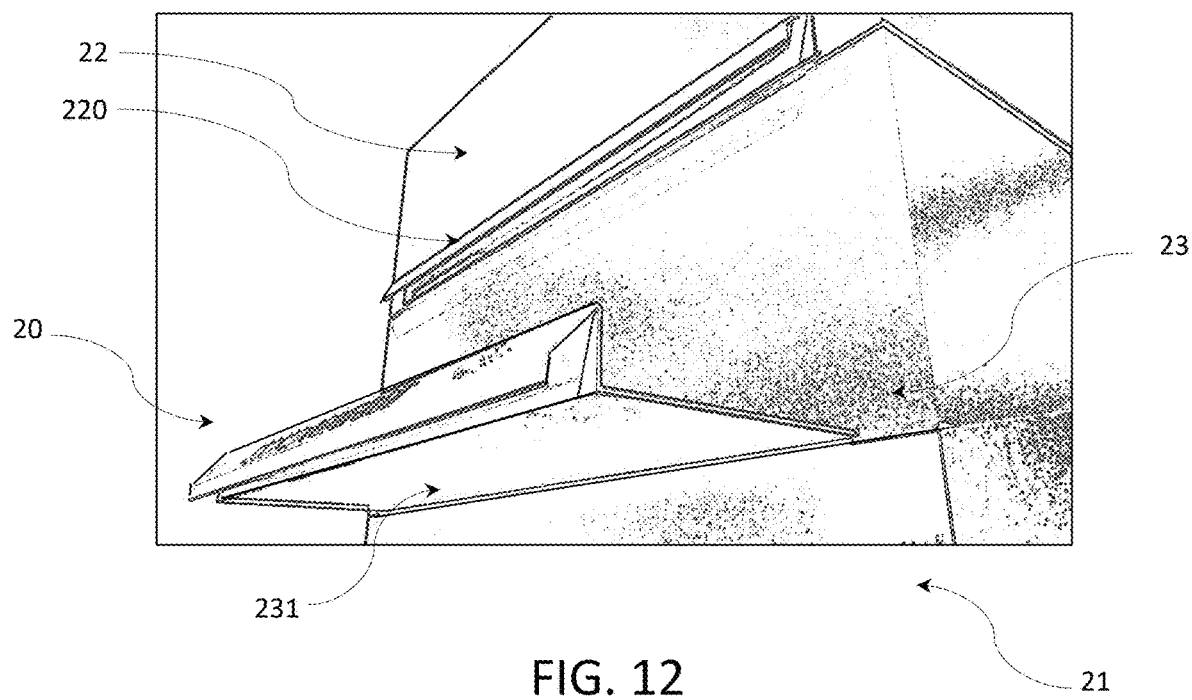
FIG. 12 is a partial perspective view illustrating the isolation container of the compost and planting system according to the above preferred embodiment of the present invention.

As shown in FIG. 4, FIG. 11 and FIG. 12, according to the preferred embodiment, the composter arrangement 20 comprises a collection container 22 and an isolation container 23. The isolation container 23, which is a tubular body sized and configured to be mounted on top of the top composting opening 212 of the composting container 21 coaxially, has a top isolation opening 232, wherein the isolation door 231 is slidably installed at a bottom end of the isolation container 23 in a sealing manner to normally enclose the composting chamber 211 of the composting container 21 and is operable to slide to open the top composting opening 212 of the composting container 21 as required to communicate the air chamber 230 with composting chamber 211, such that any organic waste contained in the air chamber 231 will fall down into the composting chamber 211 of the composting container 21 due to gravity.

The collection container 22, which is a tubular body sized and configured to be mounted on top of the top isolation opening 232 of the isolation container 23 coaxially, has a collection opening 222 provided at a top end thereof, as shown in FIG. 11, wherein the collection door 221 is slidably installed at a bottom end of the collection container 22 in a sealing manner to normally enclose the air chamber 220 of the isolation container 22 and is operable to slide to open the top isolation opening 222 of the isolation container 22 as required to communicate the collection chamber 220 with the isolation chamber 230, such that the organic waste disposed by the user in the collection chamber 220 will fall down into the air chamber 220 of the isolation container 22 due to gravity.

The collection container 22 further comprises a cover door 223 to normally cover the collection opening 222 in air-tight manner, wherein the cover door 223 is hinged to the collection container 22 and is configured to be operable to open for the user to dispose organic waste in the collection chamber 220 through the collection opening 222.

It is worth mentioning that, alternatively, the composting container 21, the collection container 22 and the isolation container 23 can be made by a single tubular container which bottom end forms a bottom composting opening. The collection door 221 and the isolation door 231 are slidably installed to an upper position and a middle position of the composting container 21 so as to define the composting chamber 211 between the bottom composting opening 213 and the isolation door 231, to define the air chamber 230 between the collection door 221 and the isolation door 231, and to define the collection chamber 220 between the cover door 223 hingedly installed at the collection opening 222.

Figure 14A:
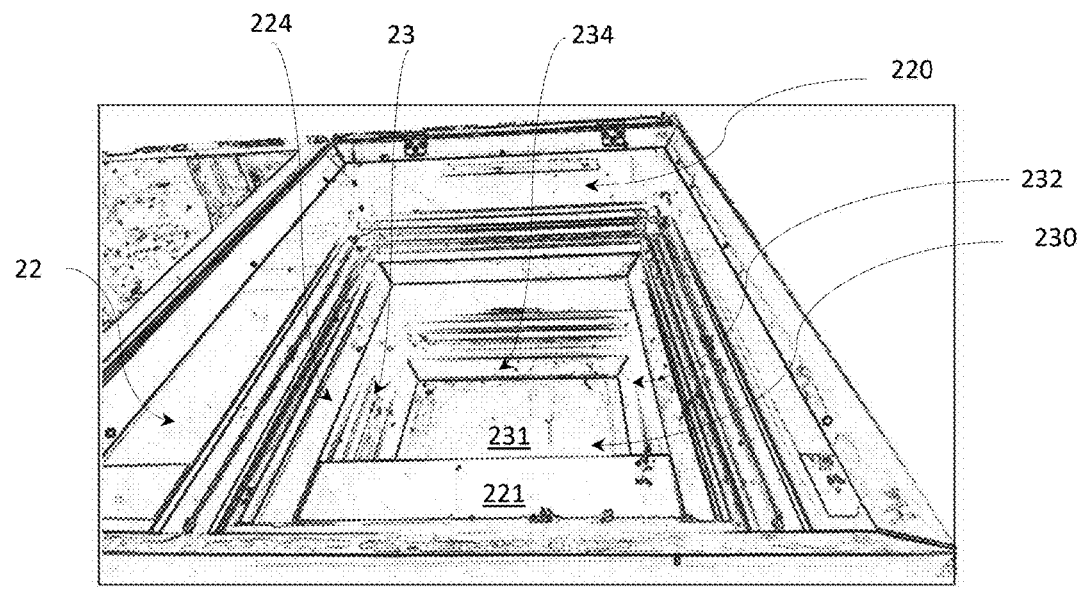
FIG. 14A to FIG. 14B are schematic views illustrating various conditions of the compost and planting method according to the above preferred embodiment of the present invention.
Figure 14B:
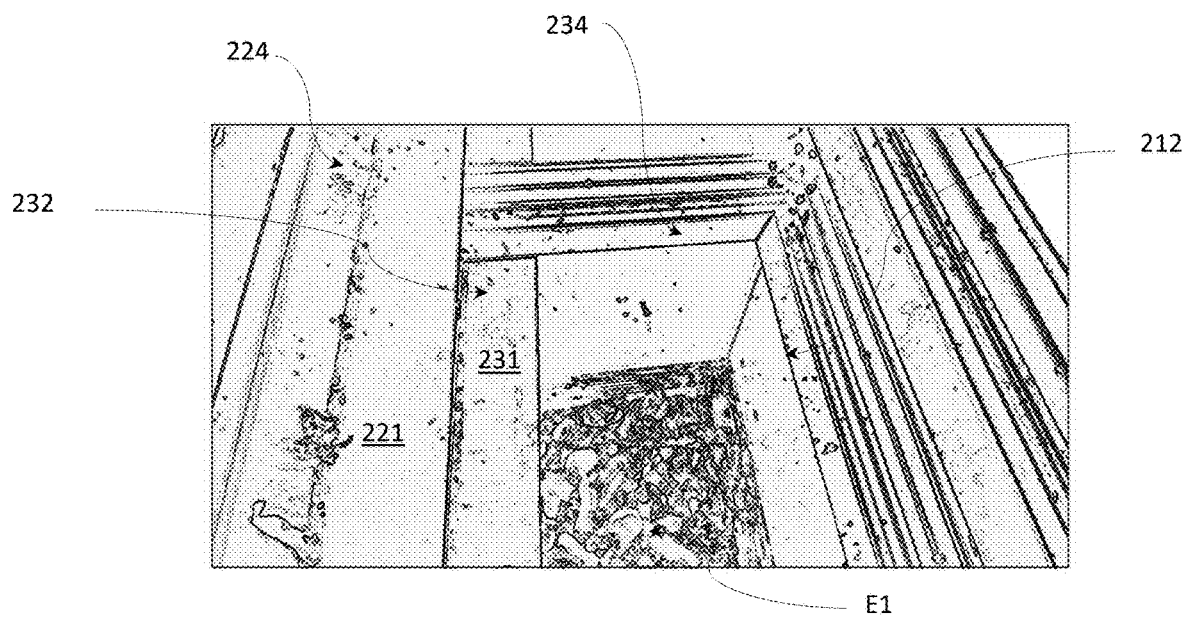

Referring to FIG. 14A and FIG. 14B, to facilitate the sliding operation of the isolation door 231 in a smooth and sealing manner, the isolation container 23 comprises an isolation rail unit 234 provided at a lower end thereof and configured for the isolation door 231 to be selectively sliding in to the close condition to close the composting opening 212 to enclose the composting chamber 212, or sliding out to the open condition to open the top composting opening 212 to communicate the composting chamber 212 with the air chamber 230. Also, to facilitate the sliding operation of the collection door 221 in a smooth and sealing manner, the collection container 22 comprises a collection rail unit 224 provided at a lower end thereof and configured for the collection door 221 to be selectively sliding in to the close condition to close the top isolation opening 232 to enclose the air chamber 232, or sliding out to the open condition to open the top isolation opening 232 to communicate the collection chamber 220 with the air chamber 230.

Figure 13A:
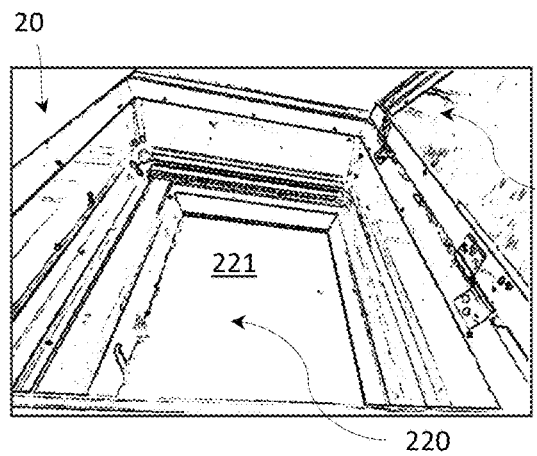
FIG. 13A to FIG. 13F are schematic views illustrating procedures of a compost and planting method according to the above preferred embodiment of the present invention.

According to the preferred embodiment of the present invention, referring to FIG. 13 to FIG. 15E, through operation of the compost and planting system described above, a compost and planting method is provided, which comprises steps of:

(a) Expose the collection chamber 220 of the composter arrangement 20 to outside by opening the cover door 223, as shown in FIG. 13A.

Figure 13B:
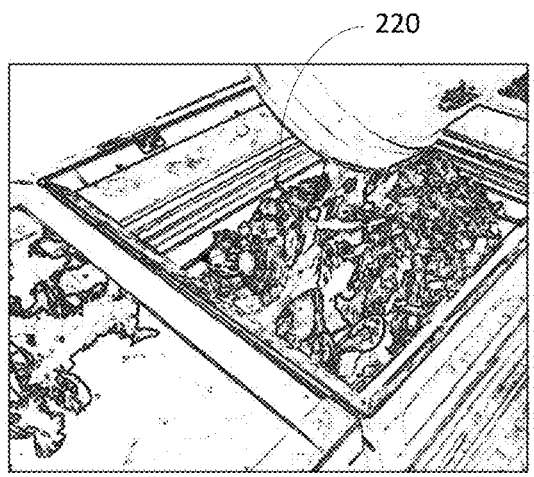

(b) Receive organic waste in the collection chamber 220, as shown in FIG. 13B.

Figure 13C:
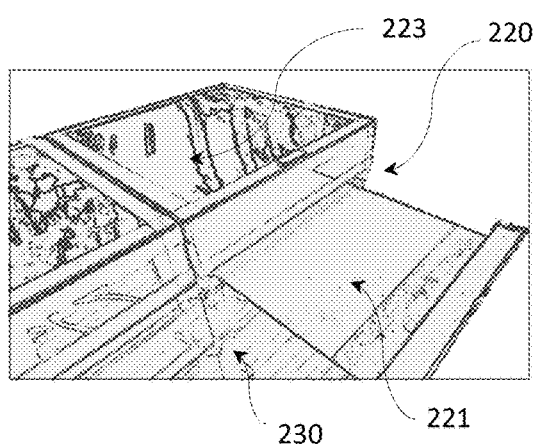

(c) Enclose the collection chamber 220 by closing the cover door 223, as shown in FIG. 13C.

Figure 13D:
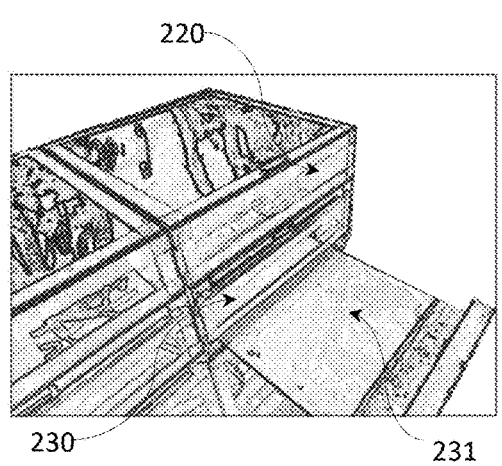
Figure 13E:
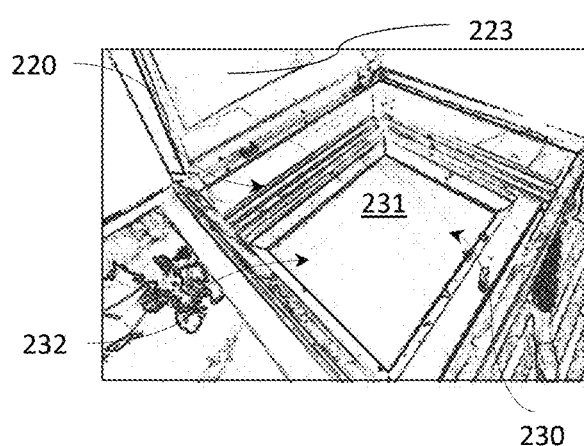

(d) Open the top isolation opening 232 of the isolation chamber 230 by operating the collection door 221 to slide out while the cover door 223 is closed, such that the organic waste disposed in the collection chamber 220 in the step (b) falls into the isolation chamber 23 through the top isolation opening 232, as shown in FIG. 13C and FIG. 13E.

(e) Enclose the top isolation opening 232 of the isolation chamber 230 by operating the collection door 221 to slide back into the collection chamber 220 to cover the top isolation opening 232 in an air-tight manner and leave an empty collection chamber 220 as shown in FIG. 13A for next pouring of organic waste therein while closing, isolating and sealing the air chamber 230 from the collection chamber 220.

(f) Open the top composting opening 212 of the composting chamber 211 of the composting container 21 by operating the isolation door 231 to slide out while the collection door 221 is in close condition, such that the organic waste in the air chamber 230 in the step (d) falls into the composting chamber 211 through the top composting opening 212, as shown in FIG. 13D.

Figure 13F:
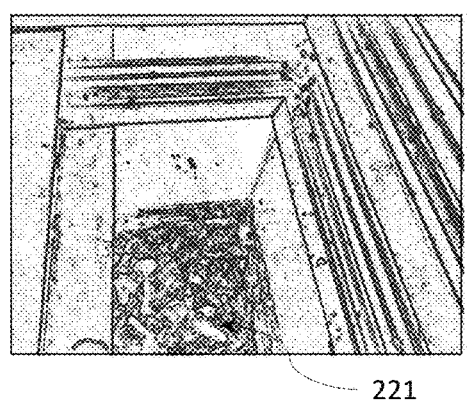

(g) Enclose the top composting opening 212 of the composting container 21 by operating the isolation door 231 to slide back into the air chamber 230 to cover the top composting opening 212 in an air-tight manner, as shown in FIG. 13E, while the collection door 221 is remained in close condition, wherein the collection chamber 220 is isolated from the composting chamber 211 by the isolation door 231 and the collection door 221 as well as the air in the air chamber 230. In other words, an air layer is provided in the air chamber 230 to effectively isolate the collection chamber 220 and the composting chamber 211, which contains the organic waste therein for composting as shown in FIG. 13F, so that when the user open the cover door 223, no residual of organic waste is left in the collection chamber 220 that allows the user to dispose the new organic waste therein while avoiding odor and flying inserts that may be produced in the composting chamber 212 so as to ensure a sanitation environment for the empty collection chamber 220.

Referring to FIG. 14A, the empty air chamber 230 is illustrated while the isolation door 231 is slid to the close condition after transferring the organic waste E1 into the composting chamber 212. Referring to FIG. 14B, both the collection door 221 and isolation door 231 are slid out to the open condition to illustrate the composting chamber 212 where the organic waste E1 decomposes into compost through time.

(h) Compost the organic waste in the composting chamber 212 of the composting container 21, as shown in FIG. 14B, while sewage produced from composting organic waste E1 flowing down into the air-water chamber 106 of the air-water circulation module 10' of the air-water source arrangement 10, as shown in FIG. 4.

(i) Inlet liquid into air-water flowing chamber 14 of the air-water source arrangement 10 as required via the liquid inlet of the air-water source arrangement 10 to flow with the sewage to the air-water chamber 106 of the bottom-up air-water circulation and irrigation module 10" of the air-water source arrangement 10 to form a lower liquid layer in the air-water flowing chamber 14 of the air-water source arrangement for the planting soil E2 to absorb for water moisture through the circulation slots 134 of the circulation hubs 13 arranged in the air-water flowing chamber 14 so as to irrigate the vegetables or plants planting in the soil tub 31, as shown in FIG. 4

(j) Maintain an upper air layer in the air-water flowing chamber 14 of the air-water source arrangement 10 by outletting the liquid exceeding a predetermined level in the air-water flowing chamber 14 of the air-water source arrangement 10 via the liquid outlet 102 of the air-water source arrangement 10, so as to provide air supply for the vegetables or plants planting in the soil tub 31, as shown in FIG. 4.

Figure 15A:
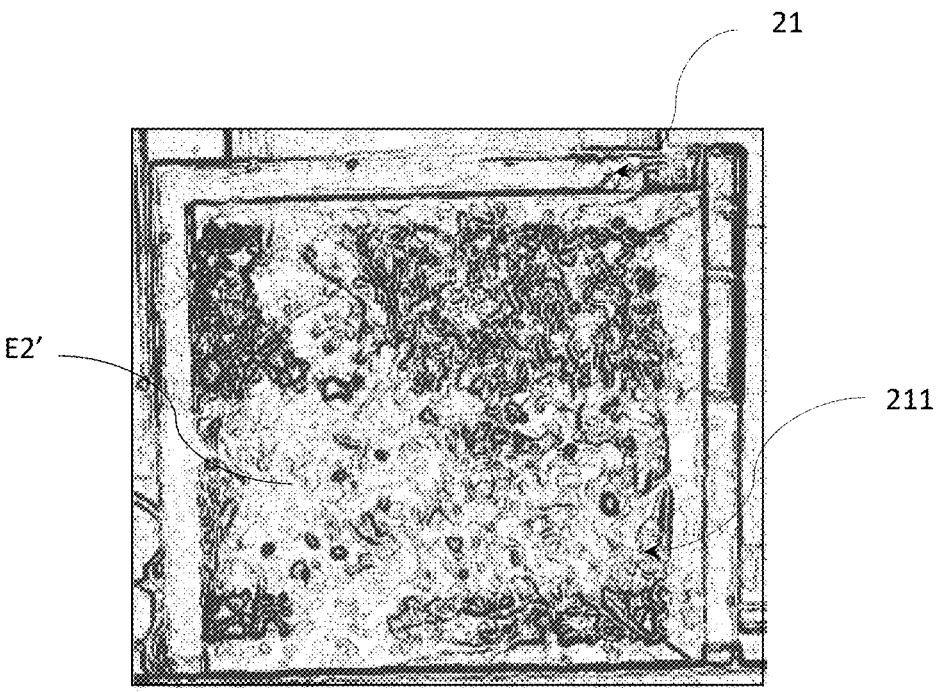
FIG. 15A to FIG. 15D are schematic views illustrating further procedures of the compost and planting method according to the above preferred embodiment of the present invention.
Figure 15B:
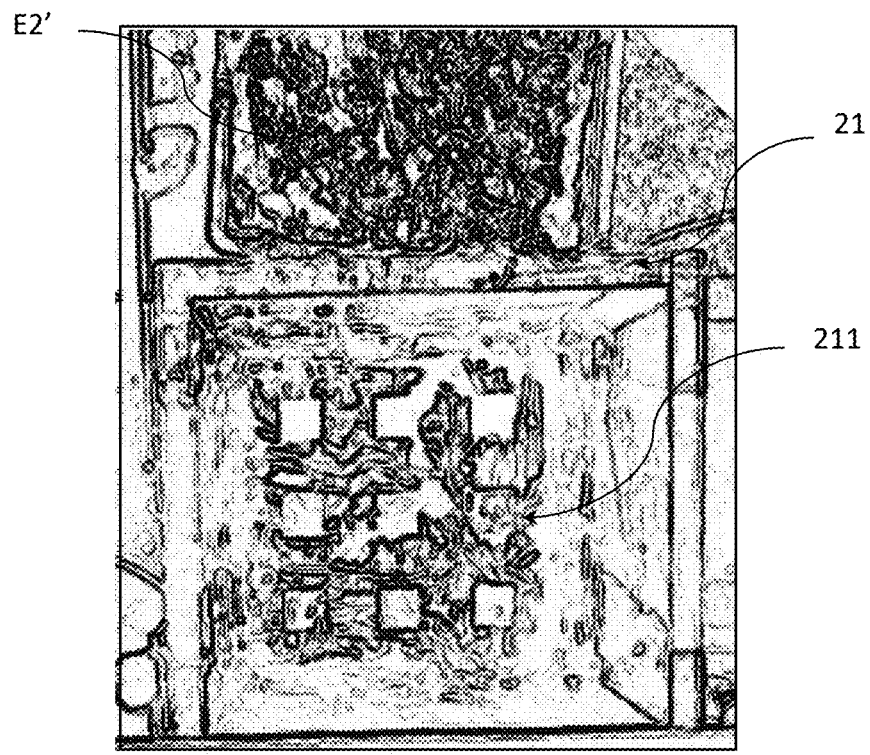

(k) Empty the composting chamber 211 of the composting container 21 after around four months that the organic waste E2 is decomposed into compost E2', as shown in FIG. 15A and FIG. 15B.

Figure 15C:
Figure 15D:
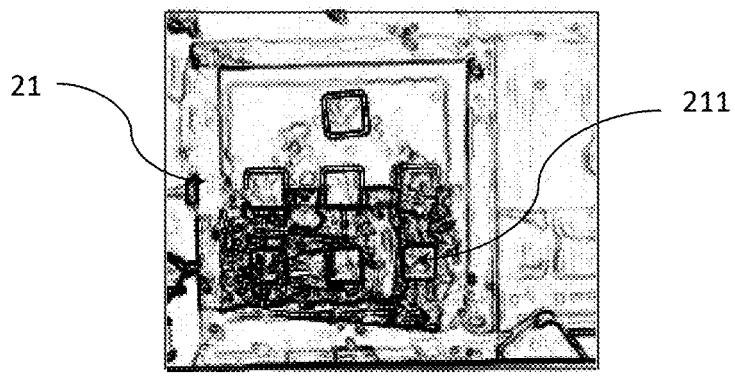

(l) Dry the compost E2' under sunshine, as shown in FIG. 15C or by a drying machine such as heater, wherein the dried compost E2" can be used as the planting soil in the soil tub 31 for planting.

(m) Clean the composting chamber 211 and the composting container 21 for the next round of composting procedures (a) to (k).

Figure 16:
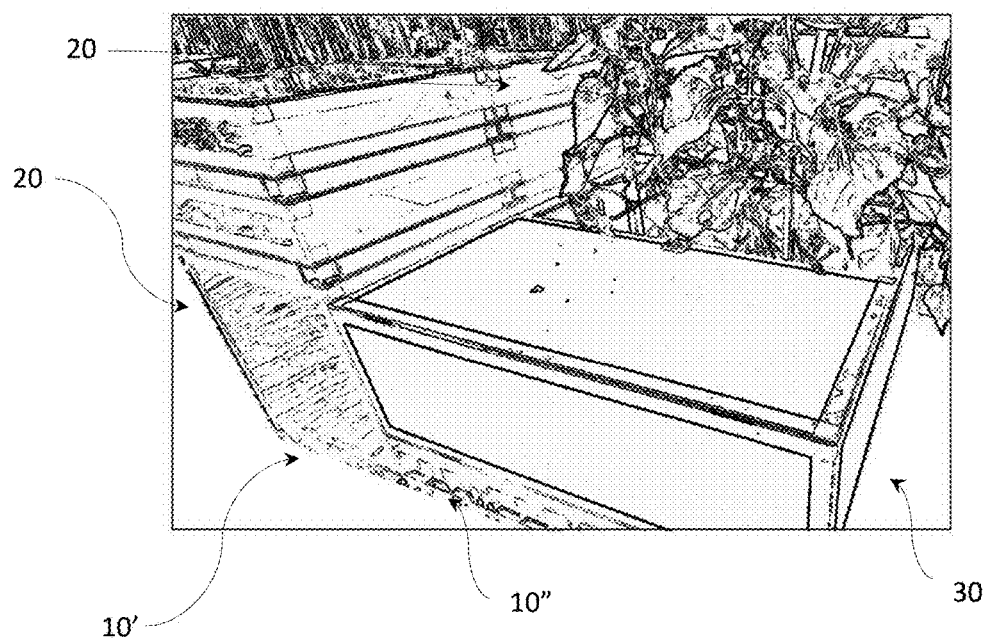
FIG. 16 is a schematic view illustrating an alternative mode of the compost and planting system according to the above preferred embodiment of the present invention.

It is appreciated that the air-water circulation arrangement 10' and the bottom-up air-water circulation and irrigation arrangement 10" of the air-water source arrangement 10 can be arranged side by side as shown in FIGS. 3 and 4, or alternatively, be arranged separately and connected with a connection tube 108 (as shown in FIG. 17A) to transfer the liquid and sewage from the air-water chambers 106 of the air-water circulation arrangement 10' to the air-water chambers 106 of the bottom-up air-water circulation and irrigation arrangement 10". The air-water circulation arrangement 10' can merely comprise one air-water circulation module 100, as shown in FIGS. 3 and 4, or two or more air-water circulation module 100, as shown in FIG. 16, for arranging two or more composter arrangement 20 thereon, depending on the volume of organic water is required to be composted.

Figure 17:
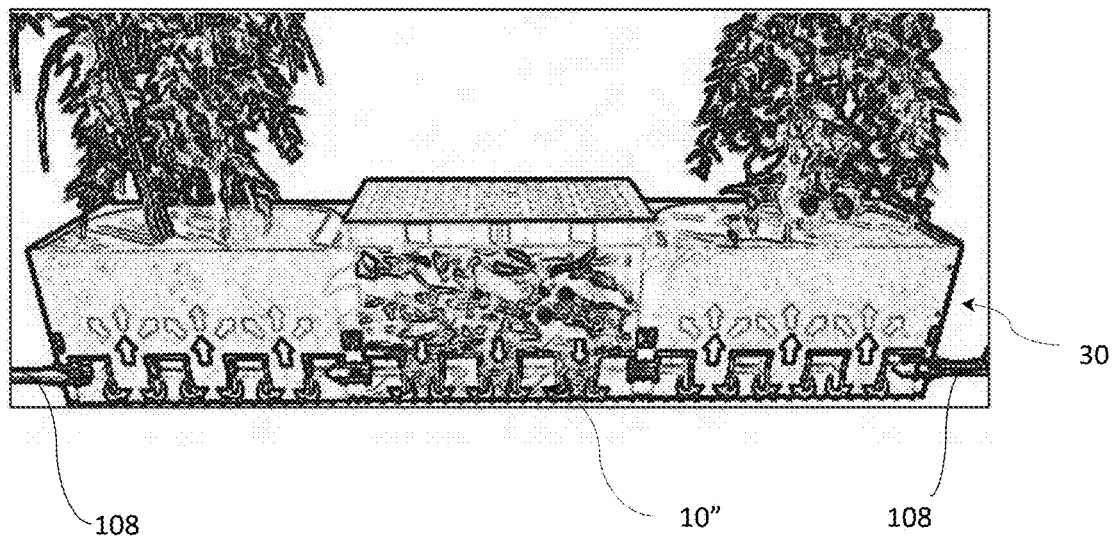
FIG. 17 is a schematic view illustrating a first alternative mode of the planting arrangement of the compost and planting system according to the above preferred embodiment of the present invention.
Figure 18:
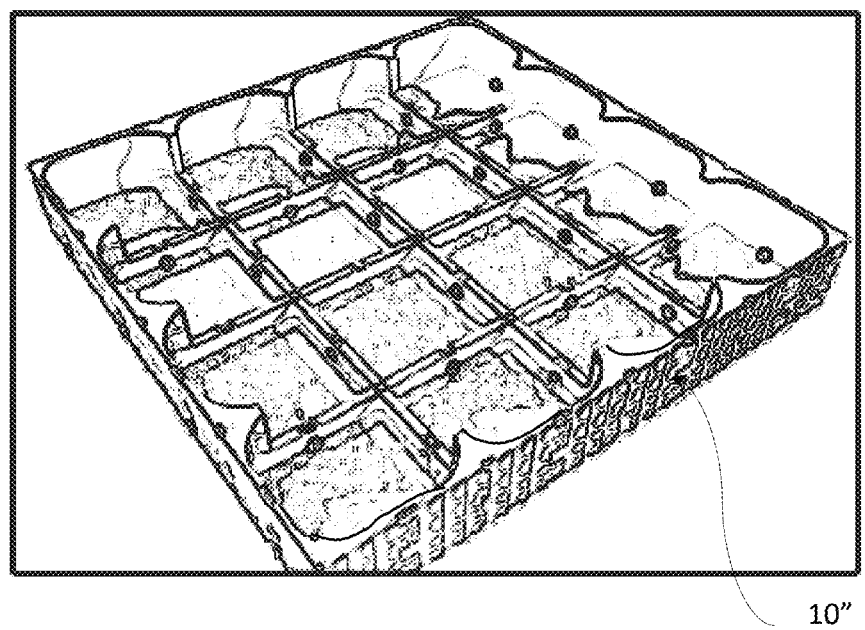
FIG. 18 is a schematic view illustrating a second alternative mode of the planting arrangement of the compost and planting system according to the above preferred embodiment of the present invention.
Figure 19:
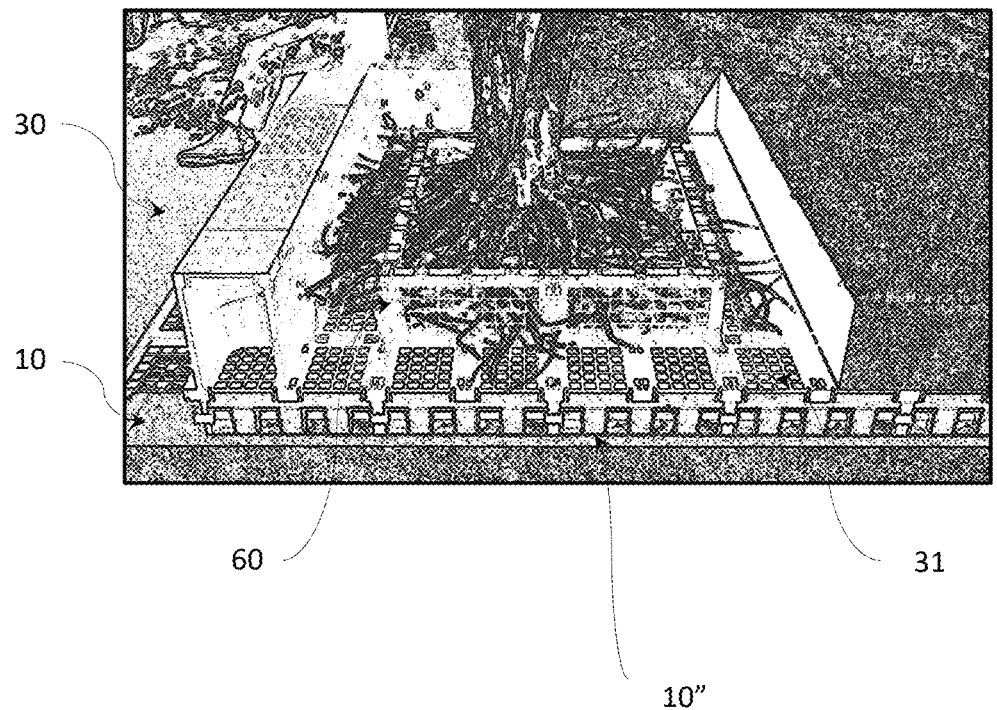
FIG. 19 is a schematic view illustrating a third alternative mode of the planting arrangement of the compost and planting system according to the above preferred embodiment of the present invention.

The air-water source arrangement 10 may comprises two or more bottom-up air-water circulation and irrigation arrangement 10" connected by the connection tube 108 for transferring liquid, each of which can be arranged into desired size and shape, such as an elongated arrangement as shown in FIG. 17 or a rectangular arrangement as shown in FIG. 18. The size and shape of the bottom-up air-water circulation and irrigation arrangement 10" depend on how much sewage is required to be treated and the need to the environment. For example, as shown in FIG. 19, a tree with a trunk having a diameter of 10-15 cms may approximately absorb and treat 300-400 kgs living sewage. It is also worth mentioning that the roots of a plant grow downwards and sidewards simply for absorbing water content to survive. Therefore, when sufficient water content and air are supplied to the plant planted in the soil tub 31 through the bottom-up air-water circulation and irrigation arrangement 10" of the air-water source arrangement 10 arranged for the soil tub 31 therebelow, the roots of the plant will remain growing in the soil tub 31 healthy. In addition, a reinforcing frame 60 may selectively be installed in the soil tub 31 of the planting arrangement 30 to entangle with the plant roots such that the plant can be supported in position rigidly and firmly to withstand windy environment therearound.

One skilled in the art will understand that the embodiment of the present invention as shown in the drawings and described above is exemplary only and not intended to be limiting, such as the recitation "water" means any liquid with water content. Also, the bottom-up air-water circulation and irrigation arrangement 10" and the planting arrangement 30 can be used independently for planting tree(s) or vegetable(s) on ground both indoor and outdoor.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A compost and planting system, comprising:
an air-water source arrangement, which has a liquid inlet, a liquid outlet and an air-water flowing chamber defined between said liquid inlet and said liquid outlet, comprising a bottom wall, a base wall and a plurality of tubular circulation hubs spacedly supported between said bottom wall and said base wall in said air-water flowing chamber, each of said plurality of circulation hubs having an upper opening end, a lower opening end, a hub cavity defined between said upper opening end and said lower opening end, and a plurality of liquid slots spacedly formed around said lower opening end communicating said hub cavity with said air-water flowing chamber;
a composter arrangement comprising a composting container, which is mounted on said air-water source arrangement and configured for containing disposed organic waste for composting, having a filtering bottom positioned on at least a first portion of said base wall of said air-water source arrangement; and
a planting arrangement comprising at least one soil tub, which mounted on said air-water source arrangement, having a bottom opening communicating with said hub cavities of said circulation hubs of said air-water source arrangement, wherein said at least one soil tub is configured for filling a planting soil therein while said planting soil also fills in said hub cavities positioned below said bottom opening of said soil tub;
thereby a sewage produced from said organic waste contained in said composting container during decomposition is drained into said circulation hubs positioned below said filtering bottom of said composter arrangement and flows into said air-water flowing chamber of said air-water source arrangement through said liquid slots of said circulation hubs, and that a liquid is fed into said air-water flowing chamber of said air-water source arrangement via said liquid inlet to carry the sewage to flow in a lower portion of said air-water flowing chamber to form a lower liquid layer while an upper portion of said air-water flowing chamber is maintained to have a flow of air to form an upper air layer, such that said liquid in the lower portion of said air-water flowing chamber enters said circulation hubs through said liquid slots thereof to be absorbed by the planting soil contained in said circulation hubs positioned below said soil tub.

2. The compost and planting system, as recited in claim 1, wherein said air-water source arrangement comprises one or more air-water circulation modules each comprising an air-water basin, a base platform and a predetermined number of said circulation hubs, wherein said air-water basin comprises a basin bottom wall and a basin surrounding wall upwardly extended from a peripheral edge of said bottom wall to define an air-water chamber therein and a top opening, wherein said base platform is sized and configured to be supported in said air-water chamber and cover said top opening, wherein a plurality of circulation holes is evenly and spacedly formed in said base platform and said predetermined number of said circulation hubs are downwardly extended around said plurality of circulation holes respectively such that said plurality of circulation holes are communicated with said hub cavities of said predetermined number of said circulation hubs respectively.

3. The compost and planting system, as recited in claim 2, wherein each of said predetermined number of said circulation hubs is supported between said base platform and said basin bottom wall of said air-water basin, wherein said upper opening ends of said predetermined number of said circulation hubs are fittingly mounted at said plurality of circulation holes of said base platform respectively such that said predetermined number of said circulation hubs is extended downwardly from said plurality of circulation holes of said base platform respectively until said lower opening ends of said circulation hubs support on said basin bottom wall of said air-water basin while said hub cavities communicating with said circulation holes respectively, and that said predetermined number of said circulation hubs significantly support said base platform above said basin bottom wall within said air-water basin.

4. The compost and planting system, as recited in claim 2, wherein said air-water chamber is a space surrounded by said surrounding wall of said air-water basin and defined around said predetermined number of said circulation hubs between said basin bottom wall of said air-water basin and said base platform.

5. The compost and planting system, as recited in claim 3, wherein said air-water chamber is a space surrounded by said surrounding wall of said air-water basin and defined around said predetermined number of said circulation hubs between said basin bottom wall of said air-water basin and said base platform.

6. The compost and planting system, as recited in claim 4, wherein each of said one or more air-water circulation modules has at least an inlet opening and an outlet opening provided in said surrounding wall of said air-water basin, wherein said inlet opening is selectively configured as said liquid inlet of said air-water source arrangement or connected to said outlet opening of another of said one or more air-water circulation modules, wherein said outlet opening is selectively configured as said liquid outlet of said air-water source arrangement or connected to said inlet opening of another of said one or more air-water circulation modules.

7. The compost and planting system, as recited in claim 5, wherein each of said one or more air-water circulation modules has at least an inlet opening and an outlet opening provided in said surrounding wall of said air-water basin, wherein said inlet opening is selectively configured as said liquid inlet of said air-water source arrangement or connected to said outlet opening of another of said one or more air-water circulation modules, wherein said outlet opening is selectively configured as said liquid outlet of said air-water source arrangement or connected to said inlet opening of another of said one or more air-water circulation modules.

8. The compost and planting system, as recited in claim 2, wherein said composter arrangement is mounted on top of at least one of said one or more air-water circulation modules which forms an air-water circulation arrangement of said air-water source arrangement to collect the sewage produced during composting of the organic waste contained in said composting container of said composter arrangement while allowing air ventilating therethrough to ensure effective and efficient decomposition of the organic waste in said composting container.

9. The compost and planting system, as recited in claim 5, wherein said composter arrangement is mounted on top of at least one of said one or more air-water circulation modules which forms an air-water circulation arrangement of said air-water source arrangement to collect the sewage produced during composting of the organic waste contained in said composting container of said composter arrangement while allowing air ventilating therethrough to ensure effective and efficient decomposition of the organic waste in said composting container.

10. The compost and planting system, as recited in claim 7, wherein said composter arrangement is mounted on top of at least one of said one or more air-water circulation modules which forms an air-water circulation arrangement of said air-water source arrangement to collect the sewage produced during composting of the organic waste contained in said composting container of said composter arrangement while allowing air ventilating therethrough to ensure effective and efficient decomposition of the organic waste in said composting container.

11. The compost and planting system, as recited in claim 8, wherein said planting arrangement is mounted on top of at least one of said air-water circulation module to form an bottom-up air-water circulation and irrigation arrangement of said air-water source arrangement to irrigate vegetables or plants planting in said soil tub of said planting arrangement by supplying sufficient air and water to the planting soil contained in said soil tub in a bottom-up manner.

12. The compost and planting system, as recited in claim 9, wherein said planting arrangement is mounted on top of at least one of said air-water circulation module to form an bottom-up air-water circulation and irrigation arrangement of said air-water source arrangement to irrigate vegetables or plants planting in said soil tub of said planting arrangement by supplying sufficient air and water to the planting soil contained in said soil tub in a bottom-up manner.

13. The compost and planting system, as recited in claim 10, wherein said planting arrangement is mounted on top of at least one of said air-water circulation module to form an bottom-up air-water circulation and irrigation arrangement of said air-water source arrangement to irrigate vegetables or plants planting in said soil tub of said planting arrangement by supplying sufficient air and water to the planting soil contained in said soil tub in a bottom-up manner.

14. The compost and planting system, as recited in claim 1, wherein said lower opening end of each of said circulation hubs has a wave shape defining a plurality of semi-circular grooves spacedly provided therearound as said plurality of liquid slots thereof.

15. The compost and planting system, as recited in claim 7, wherein said lower opening end of each of said circulation hubs has a wave shape defining a plurality of semi-circular grooves spacedly provided therearound as said plurality of liquid slots thereof, such that when said at least one air-water circulation module functioned as said air-water circulation arrangement, said semi-circular grooves of said circulation hubs allow the sewage produced from the decomposing organic waste to flow out from said hub cavities of said circulation hubs into said air-water chamber.

16. The compost and planting system, as recited in claim 10, wherein said lower opening end of each of said circulation hubs has a wave shape defining a plurality of semi-circular grooves spacedly provided therearound as said plurality of liquid slots thereof, such that when said at least one air-water circulation module functioned as said bottom-up air-water circulation and irrigation arrangement, said semi-circular grooves of said circulation hubs allow the liquid in the said-water chamber to permeate into said hub cavities of said circulation hubs and moisture the soil contained in said hub cavities of said circulation hubs and said soil tub mounted on top of said bottom-up air-water circulation and irrigation arrangement in a bottom-up manner.

17. The compost and planting system, as recited in claim 1, wherein composter arrangement has a collection chamber isolated from said composting container for disposing the organic waste therein and comprises a collection door configured to isolate said collection chamber from said composting container, such that the organic waste is disposed in said collection chamber, the decomposing organic waste is sheltered within said composting container, wherein said collection door is operatable to be opened to allow the organic waste disposed in said collection chamber to transfer into said composting container in an isolate and air-tight manner.

18. The compost and planting system, as recited in claim 17, wherein said composter arrangement further has an air chamber configured between said collection chamber and said composting container so as to significantly avoid odor produced in said composting container entering said collection chamber.

19. The compost and planting system, as recited in claim 8, wherein composter arrangement has a collection chamber isolated from said composting container for disposing the organic waste therein and comprises a collection door configured to isolate said collection chamber from said composting container, such that the organic waste is disposed in said collection chamber, the decomposing organic waste is sheltered within said composting container, wherein said collection door is operatable to be opened to allow the organic waste disposed in said collection chamber to transfer into said composting container in an isolate and air-tight manner.

20. The compost and planting system, as recited in claim 19, wherein said composter arrangement further has an air chamber configured between said collection chamber and said composting container so as to significantly avoid odor produced in said composting container entering said collection chamber.

21. The compost and planting system, as recited in claim 10, wherein composter arrangement has a collection chamber isolated from said composting container for disposing the organic waste therein and comprises a collection door configured to isolate said collection chamber from said composting container, such that the organic waste is disposed in said collection chamber, the decomposing organic waste is sheltered within said composting container, wherein said collection door is operatable to be opened to allow the organic waste disposed in said collection chamber to transfer into said composting container in an isolate and air-tight manner.

22. The compost and planting system, as recited in claim 21, wherein said composter arrangement further has an air chamber configured between said collection chamber and said composting container so as to significantly avoid odor produced in said composting container entering said collection chamber.

23. The compost and planting system, as recited in claim 11, wherein composter arrangement has a collection chamber isolated from said composting container for disposing the organic waste therein and comprises a collection door configured to isolate said collection chamber from said composting container, such that the organic waste is disposed in said collection chamber, the decomposing organic waste is sheltered within said composting container, wherein said collection door is operatable to be opened to allow the organic waste disposed in said collection chamber to transfer into said composting container in an isolate and air-tight manner.

24. The compost and planting system, as recited in claim 23, wherein said composter arrangement further has an air chamber configured between said collection chamber and said composting container so as to significantly avoid odor produced in said composting container entering said collection chamber.

25. The compost and planting system, as recited in claim 13, wherein composter arrangement has a collection chamber isolated from said composting container for disposing the organic waste therein and comprises a collection door configured to isolate said collection chamber from said composting container, such that the organic waste is disposed in said collection chamber, the decomposing organic waste is sheltered within said composting container, wherein said collection door is operatable to be opened to allow the organic waste disposed in said collection chamber to transfer into said composting container in an isolate and air-tight manner.

26. The compost and planting system, as recited in claim 25, wherein said composter arrangement further has an air chamber configured between said collection chamber and said composting container so as to significantly avoid odor produced in said composting container entering said collection chamber.

27. The compost and planting system, as recited in claim 16, wherein composter arrangement has a collection chamber isolated from said composting container for disposing the organic waste therein and comprises a collection door configured to isolate said collection chamber from said composting container, such that the organic waste is disposed in said collection chamber, the decomposing organic waste is sheltered within said composting container, wherein said collection door is operatable to be opened to allow the organic waste disposed in said collection chamber to transfer into said composting container in an isolate and air-tight manner.

28. The compost and planting system, as recited in claim 27, wherein said composter arrangement further has an air chamber configured between said collection chamber and said composting container so as to significantly avoid odor produced in said composting container entering said collection chamber.

29. A compost and planting method, comprising steps of:
(a) exposing a collection chamber of a composter arrangement to outside by opening a cover door of said composter arrangement;
(b) receiving an organic waste in said collection chamber;
(c) enclosing said collection chamber by closing said cover door;
(d) opening a top isolation opening of said isolation chamber by operating a collection door while said cover door is closed, such that the organic waste disposed in said collection chamber in the step (b) falls into said isolation chamber through said top isolation opening;
(e) enclosing said top isolation opening of said isolation chamber by operating said collection door to close said top isolation opening and leaving said collection chamber empty for next pouring of organic waste therein while closing, isolating and sealing said air chamber from said collection chamber;
(f) opening a top composting opening of a composting chamber of said composting container by operating an isolation door while said collection door is in close condition, such that the organic waste in said air chamber in the step (d) falls into said composting chamber through said top composting opening;
(g) enclosing said top composting opening of said composting container by operating said isolation door to close said top composting opening in an air-tight manner, while said collection door is remained in close condition, wherein said collection chamber is isolated from said composting chamber by said isolation door and said collection door as well as the air in said air chamber; and
(h) composting the organic waste in said composting chamber of said composting container, while sewage produced from the organic waste during composting draining down into an air-water chamber of an air-water circulation arrangement of an air-water source arrangement positioned under said composting container.

30. The compost and planting method, as recited in claim 29, further comprising steps of:
(i) inletting a liquid into an air-water flowing chamber of said air-water source arrangement as required via an liquid inlet of said air-water source arrangement to flow with the sewage to an air-water chamber of a bottom-up air-water circulation and irrigation arrangement of said air-water source arrangement to form a lower liquid layer in an air-water flowing chamber of the air-water source arrangement for a planting soil contained in a soil tub of a planting arrangement to absorb water moisture through circulation slots of each of a plurality of circulation hubs arranged in said air-water flowing chamber so as to irrigate vegetables or plants planting in said soil tub; and
(j) maintaining an upper air layer in said air-water flowing chamber of said air-water source arrangement by outletting the liquid exceeding a predetermined level in said air-water flowing chamber of said air-water source arrangement via a liquid outlet of said air-water source arrangement, so as to provide air supply for the vegetables or plants planting in said soil tub.

* * * * *